(12) United States Patent
McDowell

(10) Patent No.: US 8,121,423 B2
(45) Date of Patent: Feb. 21, 2012

(54) REMOTE USER INTERFACE RASTER SEGMENT MOTION DETECTION AND ENCODING

(75) Inventor: Brian McDowell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1152 days.

(21) Appl. No.: 11/871,719

(22) Filed: Oct. 12, 2007

(65) Prior Publication Data

US 2009/0097751 A1    Apr. 16, 2009

(51) Int. Cl.
*G06K 9/36*    (2006.01)
*G06K 9/00*    (2006.01)

(52) U.S. Cl. ........................................ 382/236; 382/181

(58) Field of Classification Search ................... 382/107, 382/181, 218, 236; 375/240.16
See application file for complete search history.

(56) References Cited

U.S. PATENT DOCUMENTS

| | | | |
|---|---|---|---|
| 5,379,071 A * | 1/1995 | Parikh et al. | ............. 375/240.12 |
| 5,488,430 A | 1/1996 | Hong | |
| 5,872,604 A | 2/1999 | Ogura | |
| 6,035,324 A | 3/2000 | Chang et al. | |
| 6,037,986 A | 3/2000 | Zhang et al. | |
| 6,185,625 B1 | 2/2001 | Tso et al. | |
| 6,298,144 B1 | 10/2001 | Pucker, II et al. | |
| 6,298,370 B1 | 10/2001 | Tang et al. | |
| 6,327,608 B1 | 12/2001 | Dillingham | |
| 6,452,972 B1 | 9/2002 | Ohara | |
| 6,678,332 B1 | 1/2004 | Gardere et al. | |
| 6,766,352 B1 | 7/2004 | McBrearty et al. | |
| 6,809,758 B1 | 10/2004 | Jones | |
| 6,828,976 B2 | 12/2004 | Butcher | |
| 7,027,615 B2 | 4/2006 | Chen | |
| 7,089,284 B2 | 8/2006 | Pardikar et al. | |
| 7,111,060 B2 | 9/2006 | Araujo et al. | |

(Continued)

FOREIGN PATENT DOCUMENTS

WO    2005008600 A1    1/2005

(Continued)

OTHER PUBLICATIONS

Response A to Office Action dated Jan. 20, 2011, U.S. Appl. No. 11/872,004, filed Oct. 13, 2007.

(Continued)

*Primary Examiner* — Daniel Mariam
(74) *Attorney, Agent, or Firm* — Vierra Magen Marcus & DeNiro LLP

(57) ABSTRACT

Raster segment commands are generated by a delta encoder and are encoded for raster segments detected to have moved in the current frame with respect to a location of the raster segment in a previous frame. Raster segment motion commands are stored in a queue and, when written, copy a raster segment into the current frame from a previous payload or cache. When written from the queue to a payload, raster segment motion commands are applied to a copy of the current frame maintained at the server using a copy of the previous payload sent. When copying a raster segment from a raster segment cache, a raster segment cache command retrieves identified raster segment data from the raster segment cache and copies the raster segment into a particular location in the current frame at the client. The raster segment commands are sent to a client via a payload to copy a raster segment from a previous payload into the current frame at the client or from a raster segment cache to the current frame.

19 Claims, 33 Drawing Sheets

U.S. PATENT DOCUMENTS

| | | |
|---|---|---|
| 7,155,676 B2 | 12/2006 | Land et al. |
| 7,360,162 B2 | 4/2008 | Shaw et al. |
| 7,415,670 B2 * | 8/2008 | Hull et al. .................... 715/716 |
| 7,634,230 B2 | 12/2009 | Ji et al. |
| 7,672,005 B1 | 3/2010 | Hobbs et al. |
| 7,770,008 B2 | 8/2010 | Walmsley |
| 2002/0129096 A1 | 9/2002 | Mansour et al. |
| 2002/0147750 A1 | 10/2002 | Kumhyr et al. |
| 2002/0186899 A1 | 12/2002 | Bohnenkamp |
| 2003/0234811 A1 | 12/2003 | Kim |
| 2004/0015981 A1 | 1/2004 | Coker et al. |
| 2004/0036711 A1 | 2/2004 | Anderson |
| 2004/0064518 A1 | 4/2004 | Almstrand et al. |
| 2004/0183756 A1 | 9/2004 | Freitas et al. |
| 2004/0184534 A1 * | 9/2004 | Wang ....................... 375/240.03 |
| 2004/0189689 A1 | 9/2004 | Barrett |
| 2004/0221004 A1 | 11/2004 | Chalfin et al. |
| 2004/0239681 A1 | 12/2004 | Robotham et al. |
| 2005/0071759 A1 | 3/2005 | Connors et al. |
| 2005/0246433 A1 | 11/2005 | Carrigan et al. |
| 2005/0283798 A1 | 12/2005 | Hunleth et al. |
| 2006/0080382 A1 | 4/2006 | Dutta et al. |
| 2006/0146059 A1 | 7/2006 | Inoue et al. |
| 2006/0158524 A1 | 7/2006 | Yang et al. |
| 2006/0174026 A1 | 8/2006 | Robinson et al. |
| 2006/0179118 A1 | 8/2006 | Stirbu |
| 2006/0209961 A1 | 9/2006 | Han et al. |
| 2007/0110160 A1 | 5/2007 | Wang et al. |
| 2007/0198656 A1 | 8/2007 | Mazzaferri et al. |
| 2007/0296721 A1 | 12/2007 | Chang et al. |
| 2008/0126812 A1 | 5/2008 | Ahmed et al. |
| 2008/0310734 A1 | 12/2008 | Ahammad et al. |
| 2010/0103953 A1 | 4/2010 | Matias et al. |

FOREIGN PATENT DOCUMENTS

| | | |
|---|---|---|
| WO | 2006074110 A2 | 7/2006 |

OTHER PUBLICATIONS

Office Action dated Feb. 15, 2011, U.S. Appl. No. 11/860,008, filed Sep. 24, 2007.

Response A to Office Action dated Mar. 1, 2011, U.S. Appl. No. 11/860,008, filed Sep. 24, 2007.

Final Office Action dated Mar. 22, 2011, U.S. Appl. No. 11/872,004, filed Oct. 13, 2007.

Response B to Office Action dated Apr. 25, 2011, U.S. Appl. No. 11/872,004, filed Oct. 13, 2007.

Office Action dated May 11, 2011, U.S. Appl. No. 11/860,008, filed Sep. 24, 2007.

Alexabder Ya-Li Wong, Operating System Support for Multi-User, Remote, Graphical Interaction, Proceedings of the 2000 USENIX Annual Technical Conference, Jun. 18-23, 2000, pp. 16-16, USENIX Association, Berkeley, CA, USA.

S. Jae Yang, The Performance of Remote Display Mechanisms for Thin-Client Computing, Proceedings of the 2002 USENIX Annual Technical Conference, Jun. 2002, pp. 131-146, USENIX Association, Berkeley, CA, USA.

Qiang Liu, New Change Detection Models for Object-Based Encoding of Patient Monitoring Video, 2005, University of Pittsburgh, School of Engineering.

David J. Fleet, Design and Use of Linear Models for Image Motion Analysis, International Journal of Computer Vision, 2000, pp. 171-193, vol. 36 Issue 3, Kluwer Academic Publishers, Hingham, MA, USA.

Gehner, Proposal for Rich Server Platform-User Interface Framework (RSP-UI), Copyright 2007 The Eclipse Foundation, http://www.eclipse.org/proposals/rsp/.

Gottfried Zimmermann, Universal Remote Console-Prototyping for the Alternate Interface Access Standard, Universal Access, Theoretical Perspectives, Practice and Experience, 7th ERCIM International Workshop on User Interfaces, 2003.

Turaga, Estimation and Mode Decision for Spatially Correlated Motion Sequences, IEEE Transactions on Circuits and Systems for Video Technology, vol. 11, No. 10, pp. 1098-1107, Oct. 2001.

Kauff et al., Fast Motion Estimation for Real-Time Shape-Adaptive MPEG-4 Video Encoding, Proc. of ACM Multimedia 2000 Workshops, pp. 55-58, Los Angeles, USA, Nov. 2000, http://ip.hhi.de/imedia_G3/assets/pdfs/ACM00.pdf.

Office Action dated Oct. 22, 2010, U.S. Appl. No. 11/872,004.

Deb et al., "RepVis: A Remote Visualization System for Large Environments", in proceedings of Workshop on Computer Graphics, Vision and Image Processing, Feb. 21-22, 2004, IIT Bombay, India, 4 pages.

Olson et al., "Remote Rendering Using Vtk and Vic," Argonne National Lab, Sep. 19, 2000, retrieved from the Internet: <URL:http://www.osti.gov/bridge/servlets/purl/764263-Hygv8Y/webviewable/764263.pdf>, 4 pages.

Dawson et al., "Optimal Parallel MPEG Encoding," Computer Science Technical Report, Cornell University, May 1996 [retrieved on Jun. 13, 2007] Retrieved from the Internet: <URL:http://www.cs.cornell.edu/Info/Projects/zeno/Projects/OPME/opme.report.html>, 7 pages.

Response to Office Action dated Jul. 21, 2011, U.S. Appl. No. 11/860,008, filed Sep. 24, 2007, 9 pages.

Supplementary European Search Report dated Aug. 2, 2011, EP Application No. 08799548.6, filed Sep. 15, 2008, 10 pages.

Wiegand, T. et al., "Overview of the H.264/AVC video coding standard", IEEE Transactions on Circuits and Systems for Video Technology, IEEE Service Center, Piscataway, NJ, US, vol. 13, No. 7, Jul. 1, 2003, pp. 560-576.

Office Action dated Aug. 25, 2011, U.S. Appl. No. 11/870,960, filed Oct. 11, 2007, 57 pages.

Notice of Allowance and Fee(s) due dated Sep. 20, 2011, U.S. Appl. No. 11/872,004, filed Oct. 13, 2007, 15 pages.

Response A to Office Action dated Nov. 17, 2011, U.S. Appl. No. 11/870,960, filed Oct. 11, 2007, 17 pages.

* cited by examiner

Current frame

New frame

Move commands generated for shapes determined to move between a current image and a new image Delta determined between current frame (after move commands) and new frame

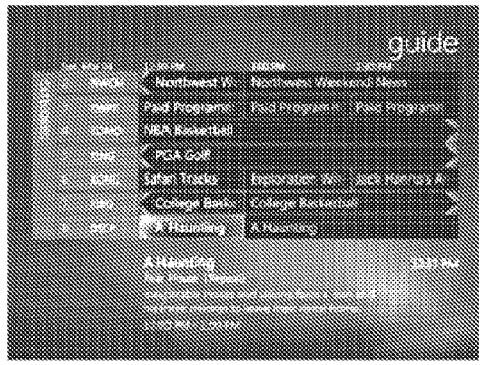
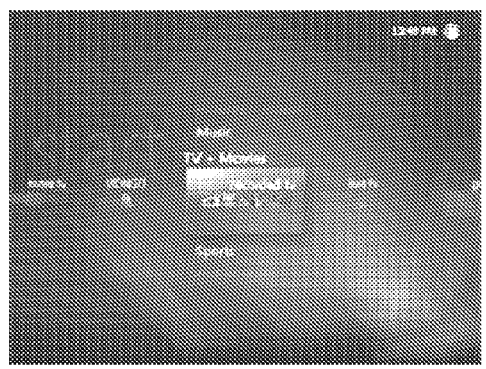
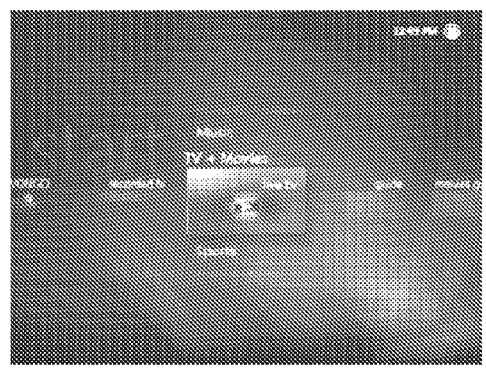
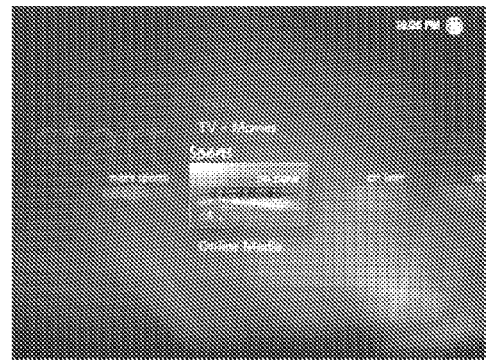
Current frames                    New frames
Figure 1F                         Figure 1G

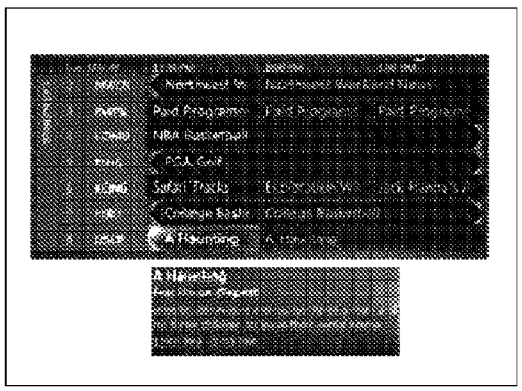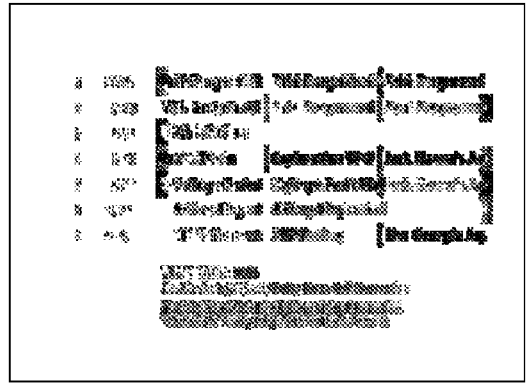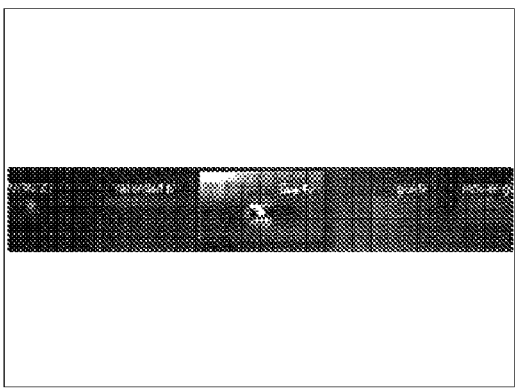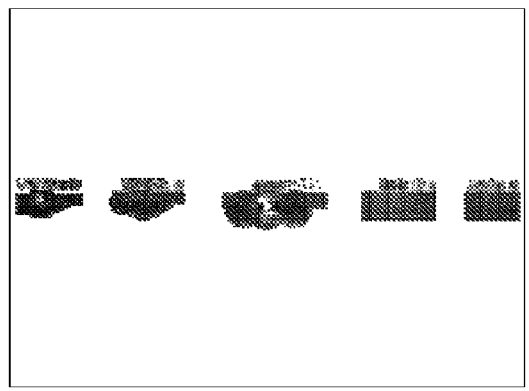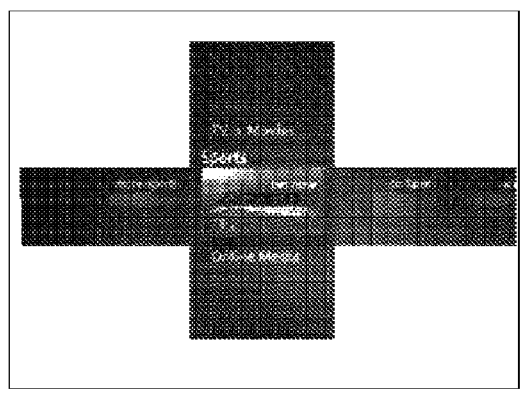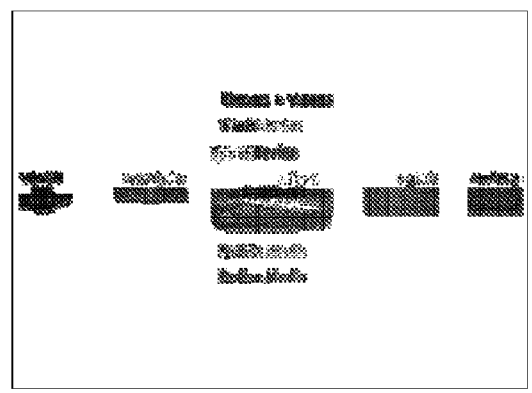
Dirty rectangle encoding     Delta encoding
Figure 1H     Figure 1I

Current frame with motion destination (S)

New Frame with motion source (D)

Current frame with motion Destination (D')

New frame with motion source (S')

RGB Raster Segment Commands
    -number of RGB raster commands
        Raster Segment Command and Command Data
            Raster Segment Motion Command
                Current Frame X,Y location, data length
                New Frame X,Y location
            Raster Segment Cache Apply Command
                Cache ID
                New Frame X,Y location
            Raster Segment Cache Addition Command
                Cache ID
                RGB Sample Length
                RGB Data for Segment
            Raster Segment Cache Removal Command
                Cache ID
Alpha Raster Segment Commands
    -number of Alpha raster commands
        Raster Segment Command and Command Data
            Raster Segment Motion Command
                Current Frame X,Y location, data length
                New Frame X,Y location
            Raster Segment Cache Apply Command
                Cache ID
                New Frame X,Y location
            Raster Segment Cache Addition Command
                Cache ID
                Alpha Sample Length
                Alpha Data for Segment
            Raster Segment Cache Removal Command
                Cache ID

Figure 11B

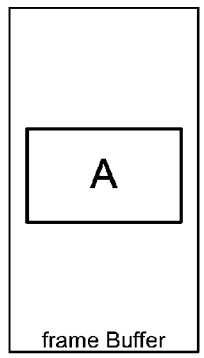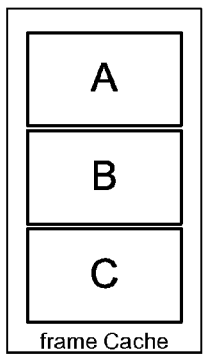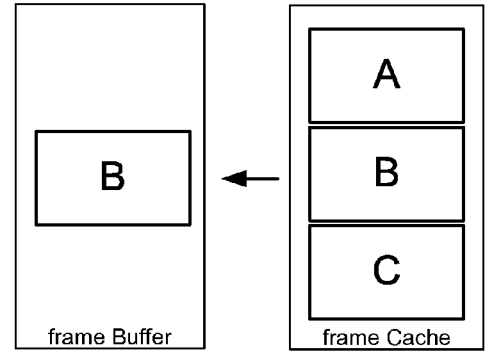
Figure 15A                Figure 15B
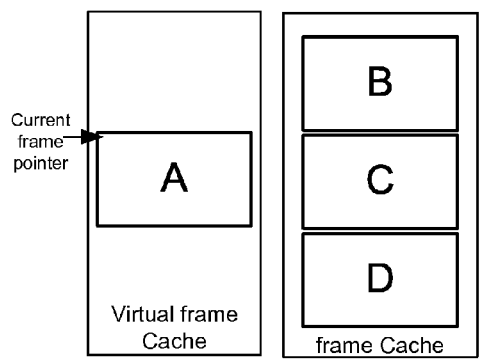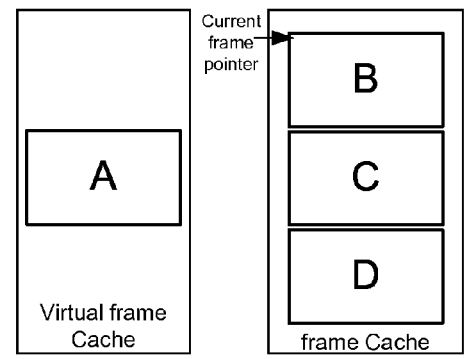
Figure 16A                Figure 16B

REMOTE USER INTERFACE RASTER SEGMENT MOTION DETECTION AND ENCODING

BACKGROUND

Existing network services provide remoting to a thin client, very thin client or other machine having limited resources. In client/server applications using a thin client, the client is designed to be especially small so that the bulk of the data processing occurs on the server. For example, remoting to a client may provide interface graphical data to a thin client which is a low-cost, centrally-managed computer usually devoid of CD-ROM players, diskette drives, and expansion slot. A remote session allows a user to login to a server through the thin client. For example, a server may provide user interface graphics to render at the client in response to user input received at the client and provided to the server.

The efficiency of previous remoting methods used for remote sessions for thin clients does not provide a viable solution to remoting issues involved with rich interfaces. In particular, when remoting a user interface with rich graphics to a thin client, previous remoting methods do not process updates to a user interface with the speed and performance that users have come to expect from modern network services. Even on a very capable client, the richness of an "entertainment centric" user interface does not correlate to efficient remoting. For example, with a normal desktop user interface, a simple command to fill a rectangle in the user interface frame can be sent to fill the background white before text is rendered using basic glyphs. However, if the user interface is a richly rendered UI with the background generated by a designer using a drawing program, photo-realistic frame and text that is anti-aliased using advanced rendering techniques to blend with that background, there are no simple commands which can be remoted to the client to achieve the resulting graphics in the frame. As a result, the frame data itself must be sent to the client. Even with modern bulk compression techniques, transmitting bitmapped graphics for a user interface frame can be expensive in terms of network bandwidth and client processing resources.

SUMMARY

The technology described herein pertains caching of raster segments generated by a delta encoder in order to eliminate redundant raster segment payloads sent from the server to the client. For example, raster segments generated by a delta encoder for a previous frame encoding, may be similar to new raster segments generated for the current frame, even if encoded different locations in the frame. Detecting these similarities and replacing new delta encoded payloads with raster segment motion commands or raster segment cache commands can utilize cache memory on the client to reduce payload sizes of encoded frames. The raster segment motion command may move a raster segment in the same raster or a different raster in the previous image to a new location in the current image. The raster segment cache command may copy a previously cached raster segment into the current frame at a new location.

When copying a raster segment from a raster segment cache, a command is created at the server that retrieves the identified raster segment data from the raster segment cache and copies the raster segment into a particular location in the current frame at the client. A raster segment cache is implemented by the server and the client, where the server raster segment cache mirrors the corresponding client raster segment cache. The created raster segment cache command is stored in a raster segment cache command queue, applied to a cache at the server, and then added to a payload. The payload is then sent to the client, the payload is parsed and the raster segment cache commands in the payload are applied to the current frame and the raster segment cache at the client.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 1F shows 3 examples of user interface current frames.

FIG. 1G shows 3 examples of user interface new frames.

FIG. 1H shows 3 graphical representations of dirty rectangle payloads.

FIG. 1I shows 3 graphical representations of delta encoded payloads.

FIGS. 15A and 15B are examples of managing a frame buffer with a frame cache.

FIGS. 16A and 16B are examples of managing a frame buffer used as a virtual frame cache and a frame cache.

DETAILED DESCRIPTION

Figure 1A:
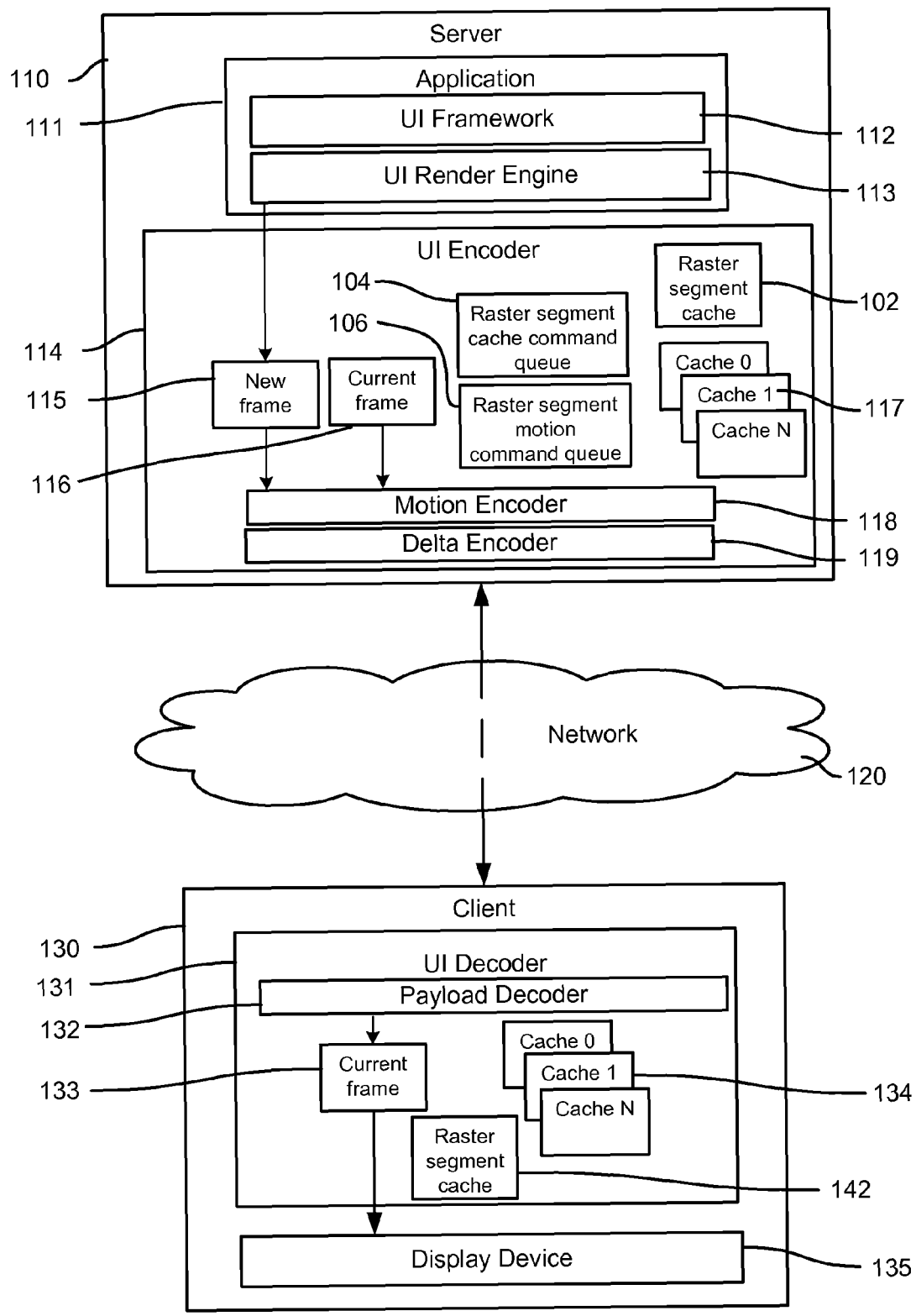
FIG. 1A is a block diagram of an embodiment of a system for remoting a user interface.

Graphical data is encoded for remoting user interfaces in real time between a server host and client over a network. The server provides graphical interface data to the thin client. The graphical data is rendered at the client and comprises a current frame. The client transmits user input to the server and the server determines whether the input causes a change in the user interface graphics. The graphics change may result in a frame of data to be rendered and remoted to the client. Remoting the interface graphics may include one or more of performing caching logic, motion encoding and delta encoding with respect to the current frame presented by the client and a new frame rendered as a result of the user input. Cache frame commands, motion commands and delta encode commands are embedded in a payload and sent to a thin client. The thin client receives the payload, decodes and parses the payload, and performs commands contained in the payload to the current active frame cache on the client to render the new frame of frame data.

In some embodiments, payload encoding may include the caching of raster segments which are generated by the delta encoder. A raster segment is a series of pixel data which have changed between the current frame and the new frame. Sending these raster segments generated by the delta encoder to the client enables the client to modify only the pixels needed to transform the current frame to the new frame. In some embodiments, the delta encoder may include a caching mechanism for these generated raster segments. The caching mechanism is used to reduce the size of the generated payload by storing re-occurring raster segments in cache memory, uniquely identifying each raster segment in the cache and sending the cache identifier and render location information to the client to avoid sending the actual pixel data in the raster segment again. In some embodiments the cache may implemented as a table of previously encountered raster segments, and can also be a cache of the previous payload sent to the device. Caching the previous payload allows for motion detection of a raster segment from one location to another between adjacent encoded frames. In this case, the current frame acts as a cache, avoiding separate caching of moving raster segments.

In some embodiments, as raster segments are generated by the delta encoder, these segments are first tested for horizontal motion within the payload by testing against raster segments in the previous payload at the same raster location, then tested for vertical motion by testing against raster segments in the other rasters of the previous payload. If motion is detected, a raster segment motion command is queued into a raster segment command queue. If motion is not detected, the raster segment is compared to the raster segments in the raster segment cache. If a match is found, a cache apply command is placed in the cache command queue for later encoding into the payload. If no match is found, the new item is placed into the cache then applied using its new unique cache identifier. When encoding is complete, the queued raster segment motion and cache commands are added to the payload and sent to the client. The client will parse these raster segment motion and cache commands which will apply any raster segment motion commands, update the client raster segment cache to match the server raster server cache, and invoke any cache apply commands to the current frame, copying cached pixel data to the current frame.

Overview of Encoding and Remote Rendering

Upon determining a user interface state change has occurred, through user interaction or other event, the server generates a new user interface frame. The new frame is to replace a current frame provided by the client as a result of the user interface state change. In some embodiments, the server provides a list of rectangles that indicate areas of the frame where changes have occurred since the last frame, the rectangles indicating areas of the last frame which are no longer valid. In some embodiments, the server identifies frame objects that move from a first position in the current frame to a second position in the new frame rendered by a render engine. A motion hint and other graphical data can be created for each moving object. Collision detection and other motion hint reducing techniques can be performed to reduce the number of hints for a frame update. The collision detection process detects and prevents motion hint from overwriting each other. The reduced set of motion hints is used to generate motion commands that are applied to a copy of the current frame maintained on the server. The server then determines the differences between the modified current frame and the new frame and encodes the difference as difference or "delta" data to a payload, using the provided invalidation rectangles to reduce the search area for possible "delta" data between the frames.

Once the delta encoding is complete, the server sends the encoded non-colliding motion commands, delta commands and other commands to the thin client. The thin client receives the commands and the difference data, applies the motion commands first and then the delta commands to the current frame. As a result, the client processes the current frame to match the new frame reflecting the changed user interface state.

In some embodiments, the present technology may also utilize frame caching to efficiently render a frame at a client. A server may instruct a client to cache frames of data determined to be the most relevant rendered frames. When sending a user interface frame update to a client, a server may determine whether or not the new interface frame matches a cached frame using a similarity threshold comparison. If the new frame matches a cached frame within a determined threshold, the server sends instructions to the client to load or select the matching cached frame rather than send frame data for the new frame over the network the client. The new frame is then differenced against the selected current cache frame by the server and the encoded delta commands are sent in the same payload as the cache command. If the new frame does not match a cached frame, the server selects the least relevant cache frame based on some criteria. Based on the criteria, the selected cache frame is replaced with the new frame data and selected as the current active cache frame.

Remote Rendering System

FIG. 1A is a block diagram of an embodiment of a system for remotely rendering a user interface. The system of FIG. 1A includes server 110, network 120 and client 130. Server 110 includes application 111 and user interface (UI) encoder 114. Application 111 includes UI framework 112 and UI render engine 113. UI render engine 113 renders graphical data for a user interface, including a new frame, dirty rectangles representing portions having changed pixels between a current frame and new frame, and motion hints. In some embodiments, when rendering a new user interface frame, UI render engine 113 may move graphical objects within a current frame to render the new frame. As a result of moving the graphical objects, the UI render engine has knowledge of and may generate motion hints and determine dirty rectangles.

UI Encoder 114 includes raster segment cache 102, raster segment cache command queue 104, raster segment motion command queue 106, new frame 115, current frame 116, cached frames 117, motion encoder 118 and delta encoder 119. As illustrated, several cached frames 0-N may be included in cached frames 117. Delta encoder 119 determines and encodes differences or "deltas" between a new frame and current frame which may or may not be modified. The current frame may be modified by applying motion commands to the current frame. Delta encoder may encode RGB data, alpha data (or some other type of data format used to present graphical information) to generate a payload which is transmitted from server 110 to the client 130.

Raster segment cache 102 within UI encoder 114 may be used to store cached raster segments. In some embodiments, only raster segments that meet a criteria are stored in raster segment cache 102, such as raster segments between 4-200 pixels in length or some other range. Raster segment cache 142 is maintained to mirror the raster segment cache 102 at Server 110, and contains one or more raster segments that were sent in previous payloads sent to client 130 by server 110. The cached raster segments may be copied into the current frame by raster segment cache commands included in a payload.

Raster segment cache command queue 104 may be used to cache raster segment cache commands at the server. Raster segment cache commands provide instructions for copying, adding or removing raster segments stored in raster segment cache 142 at client 130. The raster segment cache commands are cached before they are encoded into a payload that is transmitted to client 130. In some embodiments, there may be a raster segment cache command queue for each of several types of graphical information data formats (such as RGB data and/or alpha data) or a single cache may be used for two or more graphical information data formats.

Raster segment motion command queue 106 may be used to cache raster segment motion commands at the server. Raster segment motion commands provide instructions for copying raster segments contained in a previous payload sent to client 130. The raster segment motion commands are cached before they are encoded into a payload that is transmitted to client 130. In some embodiments, there may be a raster segment motion command queue for each of several types of graphical information data formats (such as RGB data and/or alpha data) or a single cache may be used for two or more graphical information data formats.

Application 111 of server 110 generate frames for a user interface via UI framework 112 and UI render engine 113. The frames, including dirty rectangles and motion hints, are sent to the UI encoder 114 as a series of new frame 115, processed by the cache logic within UI Encoder 114 and motion encoder 118, and then delta encoded against current frame 116 before being sent to the Client 130 as an encoded payload. Motion hints can be specified by the UI Render Engine 113 and passed to the UI Encoder 114. The UI encoder will sort and verify these hints in the motion encoding logic 118 to properly handle overlaps and verify that frame data hints result in useful motion commands. Operation of application 111, UI encoder 114 and other server functionality is discussed in more detail below with respect to FIGS. 2B-10.

In some embodiments, the present technology may be used to update only a portion of an entire user interface frame or separately and simultaneously update multiple portions of an entire user interface frame. Each user interface frame portion may include a sub-window, frames that don't consist of the entire user interface, or other portions of the user interface frame. The user interface frame portions may be visible or non-visible, have different sizes, and/or provide caching differently. When addressing one or more portions of a user interface frame, multiple instances of UI encoder 114 and UI decoder 131 (as well as other modules, optionally) may be instantiated at a server and/or client. The multiple instantiations may each maintain payload streams between the server and the client. Though, the following discussion will address a single instantiation address an entire user interface frame, it is intended that the present technology can be applied to less than an entire user interface frame as well as simultaneously updating multiple portions of an user interface frame.

Network 120 may be implemented as the Internet or other WAN, a LAN, intranet, extranet, private network or other network or networks.

Client 130 may be a thin client used to remotely access and render interface graphics provided by server 110 over network 120. Client 130 includes UI decoder 131 and display device 135. UI decoder 131 includes raster segment cache 142, payload decode 132, current frame 133 and cache frames 134. Payload decoder 132 is a module or set of code and/or hardware that decodes a payload and applies commands, deltas and other payload data against current frame 133 or one of cached frames 134. Operation of payload decoder 132 and other elements of client 135 are discussed in more detail below with respect to FIGS. 2A and 14-19.

Raster segment cache 142 within UI decoder 131 may be used to store cached raster segments at the client. Raster segment cache 142 contains one or more uniquely identified raster segments received in previous payloads sent to client 130 by server 110. The cached raster segments may be copied into the current frame, removed or added by raster segment cache commands included in a received payload.

Figure 1B:
FIG. 1B is an example of a current frame rendered in a user interface.
Figure 1C:
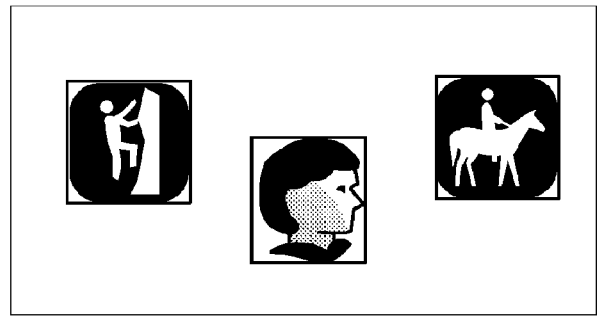
FIG. 1C is an example of a new frame rendered in a user interface.

FIGS. 1B-1E illustrate a progression of frame processing implemented by the current technology. FIG. 1B is an example of a current frame rendered in a user interface at client 130. The current frame in FIG. 1B includes three rectangles of pixel data which are associated with, from left to right, a skier icon, a rock climber icon and a face icon. FIG. 1C is an example of a new frame to be rendered in the user interface as a result of a user interface update rendered at UI Encoder 114 new frame 115. The new frame of FIG. 1C can be rendered in response to user input and will replace the current frame of FIG. 1B. The new frame differs from the current frame in that the rock climber rectangle and face rectangle are in a different position, the skier rectangle is not present in the new frame, and a new horse rider rectangle is included.

Figure 1D:
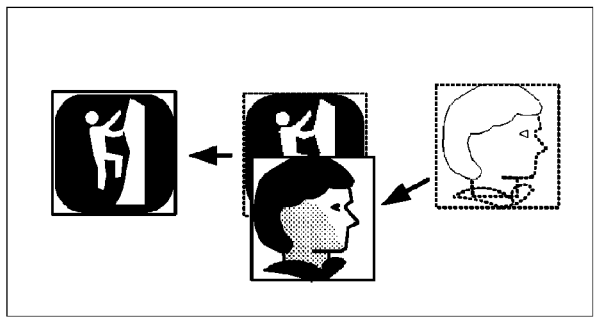
FIG. 1D is an example of how move commands are applied to a frame.

FIG. 1D illustrates how motion commands are applied to the rectangles in the current frame and the new frame. Motion commands may consist of a motion vector, shape information for the shape to more (such as a rectangle length and width), and an origin for the shape. A first motion vector indicates that the rock climber rectangle has moved from the center of the screen to the left side of the screen in a horizontal direction. A second motion vector indicates that the face rectangle has moved from the right side of the screen to the center and to a vertical position located below its previous position in the current frame. The system may also detect that the new position of the face rectangle overlaps with the original position of the rock climber rectangle. Thus, there is motion collision between the new pixels of the face rectangle and the old pixels of the rock climber rectangle. The motion collision process determines that the motion command for the rock climber rectangle must be applied before the motion command for the face rectangle so the original pixels comprising the rock climber rectangle are not overwritten by the movement of the face icon rectangle. Once motion commands are sorted and otherwise processed (discussed in more detail below), the motion commands are applied to the copy of the current frame stored at the server.

Figure 1E:
FIG. 1E is an example of a difference frame is derived from a current frame and a new frame.

After the motion commands have been applied to the current frame at the server, the difference in pixel values is determined between the modified current frame and the new frame. FIG. 1E illustrates the difference between the modified current frame of FIG. 1D (after the motion commands have been applied) and the new frame of FIG. 1C. The only difference is the horse riding rectangle on the right side of the frame in FIG. 1E. Since the positions of the rock climbing rectangle and the face rectangle should match or be within a threshold, there is no recognizable difference between these pixels as illustrated in the difference frame of FIG. 1E. As a result, a payload for updating the current frame of FIG. 1B to the new frame of FIG. 1C would consist of encoded motion commands for the moving face rectangle and rock climbing rectangle and encoded pixel data for the difference comprising the horse riding rectangle.

FIG. 1F shows an example of 3 current frames which a UI render engine could pass to the UI Encoder 114. FIG. 1G shows 3 examples of the next frame showing changes in the user interface to be encoded and remoted to the client 130.

FIG. 1H shows a graphical representation of the payload which would be generated from current frames in FIG. 1F and new frames in FIG. 1G using tradition dirty rectangle remoting techniques where all bitmap data within the dirty rectangles are remoted to the client 130. FIG. 1I shows a graphical representation of the payload which would be generated from current frames in FIG. 1F and new frames in FIG. 1G using a delta encoder, which shows only the pixels which were not similar being encoded and remoted to client 130.

Generation of Payload by Motion Cache and Delta Encoding

Figure 2A:
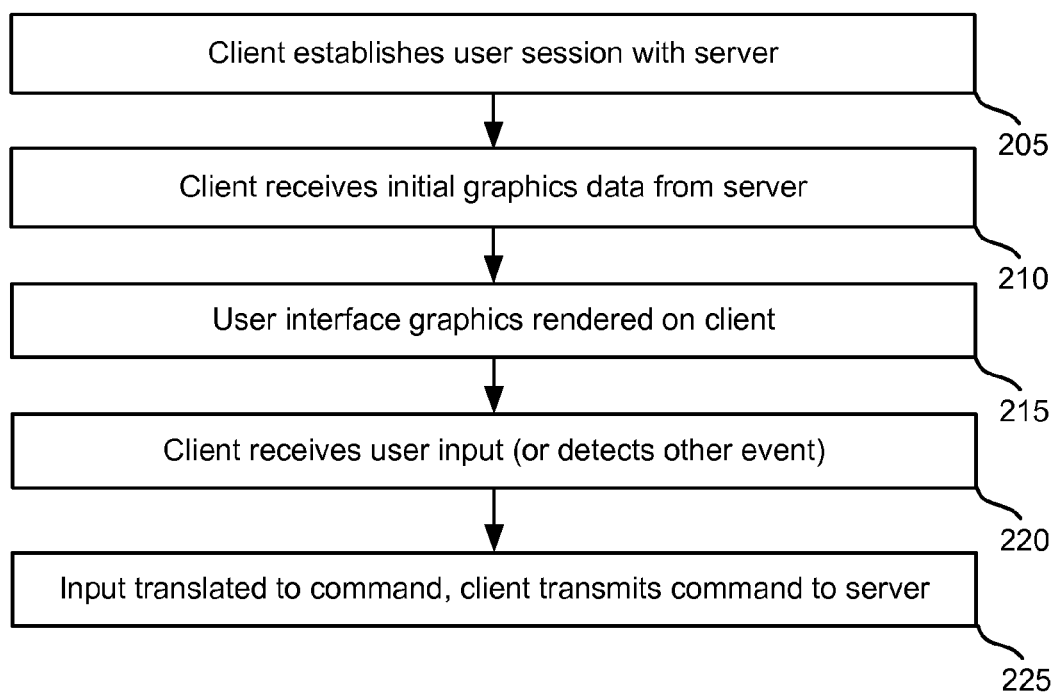
FIG. 2A is a flowchart of an embodiment of a method for establishing a remote session.

Server application III and UI encoder 114 may generate and transmit a payload to client 130 over network 120. In some embodiments, the payload may be generated and transmitted during a remote session between server 110 and client 130 and in response to input data received from client 130 by server 110. FIG. 2A is a flowchart of an embodiment of a method for establishing a remote session. The method of FIG. 2A provides details for establishing a remote session from a client point of view. Details regarding rendering, encoding and transmitting user interface graphics to the client in a payload after the remote session has been established is discussed in more detail below in FIG. 2B. Details regarding receiving and decoding user interface graphics by client 110 are discussed in more detail below in FIG. 12A.

First, client 130 establishes a remote session with server 110 over network 120 at step 205. The user session is a remote session allowing client 130 to remotely render user interface graphics associated with an interface provided by server 110. Next, initial user interface graphics are received by client 130 from server 110 at step 210. Providing the initial graphics may include providing an initial frame, one or more cached frames, or other graphical data, such as a set of initial backgrounds to be cached at the client. The user interface graphics are rendered at client 130 at step 215 and client 110 receives user input through the initial user interface (or detects some other event at the client) at step 220. In some embodiments, step 220 may include detecting the occurrence of another event for which data is transmitted to server 110, such as the expiration of a timer. The discussion below will proceed with respect to receiving user input, but could be based on non-user initiated event as well. The received user input is translated to a command and transmitted to server 110 by client 130 at step 225. Server 110 may receive the user command from client 130 and process the command. Processing a command from a client to encode and transmit a payload is discussed in more detail below with respect to FIG. 2B.

Figure 2B:
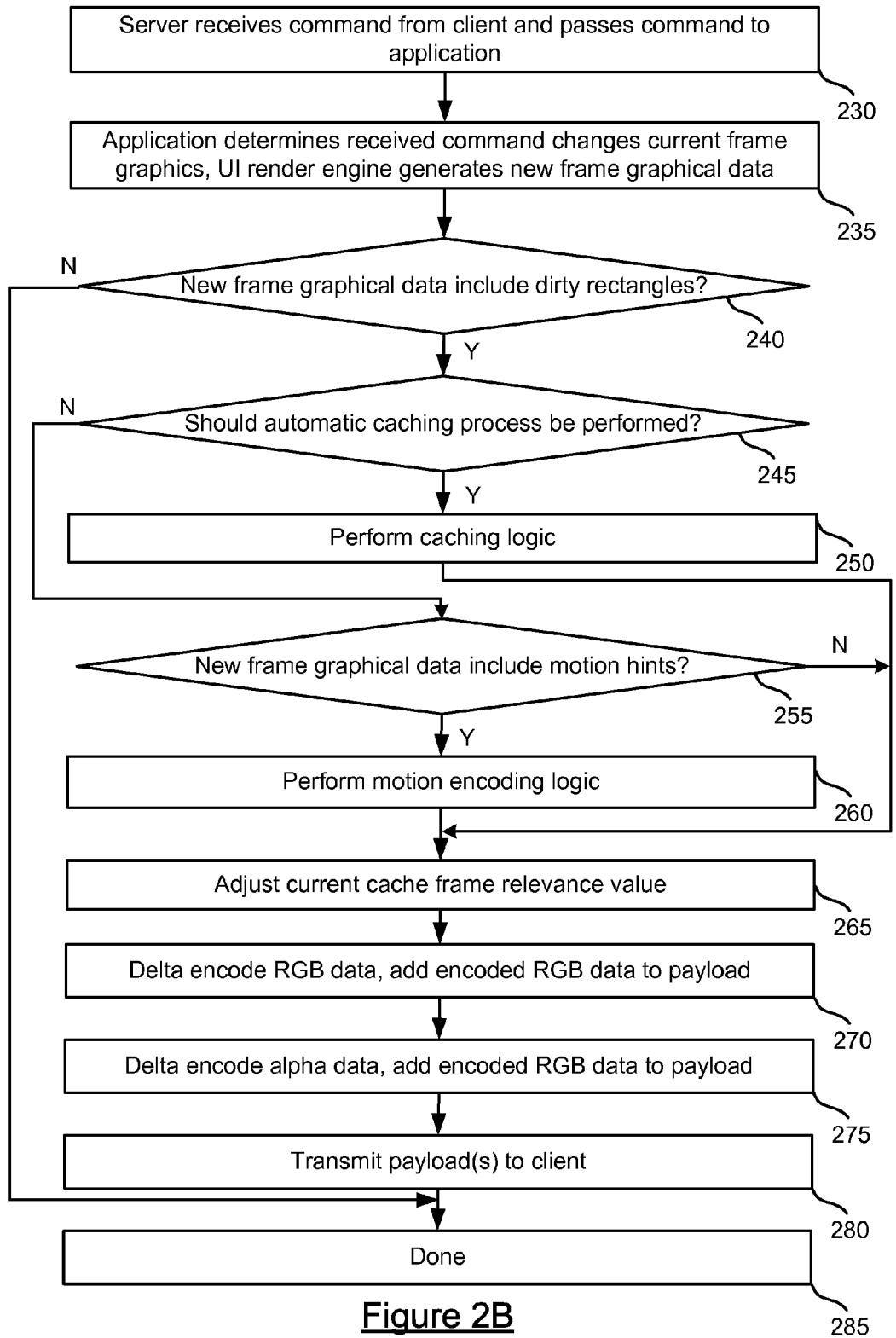
FIG. 2B is a flowchart of an embodiment of a method for encoding and transmitting a payload by a server.

FIG. 2B is a flowchart of an embodiment of a method for encoding and transmitting a payload by a server. The method of FIG. 2B may be performed in response to receiving a command, user input, or other data from client 110. First, server 110 receives a command from client 130 and passes the command to application 111 at step 230. Next, application 111 determines that the received command changes the current frame graphics and UI render engine 113 generates new frame graphical data at step 235. In some embodiments, new frame graphical data may include any of a new frame, motion hints, and dirty rectangles representing changes between a current frame and the new frame. As discussed above with respect to FIG. 1A, when UI render engine renders a new frame, it may move objects within a current frame to create the new frame. By moving one or more objects, the UI render engine has knowledge of graphical content that moves between a current frame and the new frame to replace the current frame. The UI render engine may then generate motion hints based on objects that it moves to create the new frame and dirty rectangles which comprise one or more bounding rectangles that enclose the source and destination of the objects that have moved. In some embodiments, different shapes may be used to indicate a "dirty" or changed portion of a frame, such as a circle, square, triangle, polygon, or any other shape. Generally speaking, rectangles will be referred to throughout this discussion for purposes of example only, and are not intended to limit the scope of the present technology. Generating new frame graphical data is discussed in more detail below with respect to FIG. 3.

A determination is then made as to whether the graphical data includes dirty rectangles at step 240. If the graphical data generated at step 235 includes one or more dirty rectangles, method continues to step 245. If the graphical data does not include one or more dirty rectangles, then no graphics in the current frame have been changed in the new frame, no payload needs to be sent to client 130 and the method ends at step 285.

A determination is made as to whether an automatic caching process should be performed at step 245. In some embodiments, automatic caching can be performed if requirements are satisfied with respect to a full screen update, caching is enabled at the server and similarity of the new frame to the current frame. In some embodiments, automatic caching may be performed based on a subset of these requirements or other requirements. More detail for determining whether an automatic caching process should be performed is discussed in more detail below with respect to FIG. 5. If an automatic caching process should not be performed, the method of FIG. 2B continues to step 255. If the automatic caching process should be performed, then the method continues to step 250.

Caching logic is performed at step 250. Caching logic determines whether it would be more efficient to delta encode a new frame against a cached frame rather than the current frame. Caching logic may result in outputting a cache command into an encoded payload and switching to a new cache frame at the client. Server 110 may maintain a copy of the cached frames maintained at the client and may switch to the corresponding new cache frame (maintained at the server) when cache commands are encoded. More detail for performing caching logic is discussed below with respect to the method of FIG. 6. After performing caching logic, the method of FIG. 2B continues to step 265.

In some embodiments, automatic caching and motion encoding are not performed on the same user interface update. Automatic caching involves determining that less data may be encoded into a payload be selecting an frame cached at the client (other than the current frame) and performing delta encoding between the selected cache frame and a new frame. Motion encoding involves determining one or more rectangles or other shapes of graphical data that have moved between a current frame and a new frame based on motion hints, reducing the motion hints and generating motion commands from the reduced set of motion hints, and applying the motion commands to the current frame. If delta encoding against a selected cached frame is determined to be more efficient than delta encoding against a current frame, then it is inherent that the selected cached frame and current frame are different. Therefore, applying the motion commands to the cached frame will not result in the same modified frame as applying the motion commands to the current frame (which is what the motion hints were generated from). Modifying the cached frame with motion commands generated for the current frame would likely require a large delta encoded payload to "fix" the modified cache frame into the new frame. In this embodiment, caching logic in step 250 and motion encoding logic in 260 are mutually exclusive in that only one set of logic operations will be performed on any given frame. However, there other embodiments exist in which these operations are not mutually exclusive.

If it is determined that the automatic caching process should not be performed at step 245, a determination is made as to whether the new graphical data includes motion hints at step 255. The motion hints are required for motion encoding. If UI render engine 113 generated one or more motion hints at step 235, then motion encoding logic is performed at step 260. Motion encoding logic determines whether any motion commands should be generated from the motion hints and encodes any motion commands into the payload. In some embodiments, when considering whether to generate motion commands, the motion encoding logic may remove overlapping hints and clip, order and verify the motion hints. Generated motion commands may be output to a payload and/or applied to the current frame maintained at the server. Performing motion encoding logic is discussed in more detail with respect to FIG. 7. After performing motion encoding logic, the method of FIG. 7 continues to step 265.

The current cache frame relevance value is adjusted at step 265. In some embodiments, UI encoder 114 of server 110 may track and adjust a relevance value for each frame cached at client 130. In some embodiments, the relevance value may be adjusted based on the use of the frame. For example, each time a particular frame is used in response to user input or some other event requiring an update to the user interface graphics, the relevance value for that frame may be incremented. The relevance value may be used to determine which cached frames to keep at the client, which cached frames can be overwritten when cache space is needed, and/or for other purposes. The relevance value for the current cache frame is adjusted, for example by incrementing the relevance value, at step 265.

Delta encoder 119 performs delta encoding of red-green-blue (RGB) data and adds the encoded RGB data to a payload at step 270. Delta encoding of RGB data may include determining the difference or "delta" between the new frame rendered by UI render engine 113 and either a modified current frame in which motion commands have been applied or a cache frame selected by the cache logic process. The delta encoding process may encode pixel differences in segments within a raster. The segments may be lossless and represent the exact difference in color value or be lossy to some degree based on a specified tolerance. For lossy segments, fragmentation between the segments is minimized by allowing short runs of non-delta values (pixels with the same data value) to be included in the raster segment. By including a short run of non-delta values in a segment containing delta values, creating a new raster segment is avoided along with the storage overhead in the output stream required by a new segment. Delta encoding RGB data is discussed in more detail below with respect to FIG. 7.

In some embodiments, alpha data in a user interface frame may be encoded separately from RGB data. Because the encoded alpha data may not vary as much as the RGB data delta, separately encoding the alpha data from the RGB data can result in a smaller and more efficient payload. Alpha delta encoding and adding the encoded alpha data to the encoded payload is performed at step 275. Delta encoding the alpha data includes determining the difference between the alpha data in the new frame rendered by UI render engine 113 and the alpha data in either a modified current frame in which motion commands have been applied or a cache frame selected by the cache logic process. The delta encoding process may encode pixel differences in segments within a raster in similar manner to encoding of RGB data. The alpha encoded segments may be lossless and represent the exact difference in alpha value or be lossy to some degree based on a specified tolerance. Fragmentation between segments is minimized by allowing short runs of non-delta alpha values to be included in the raster segment to avoid creating a new raster segment which would require more storage overhead in the output stream than to simply include the short run of non-delta alpha values. In some embodiments, the alpha data may be run length encoded if the length of constant alpha values was long enough to store it more efficiently than as one or more segments. Run length encoding (RLE) of alpha values can be advantageous because alpha values are often constant over entire longer pixel runs, entire rasters, or even entire frames.

Figure 11A:
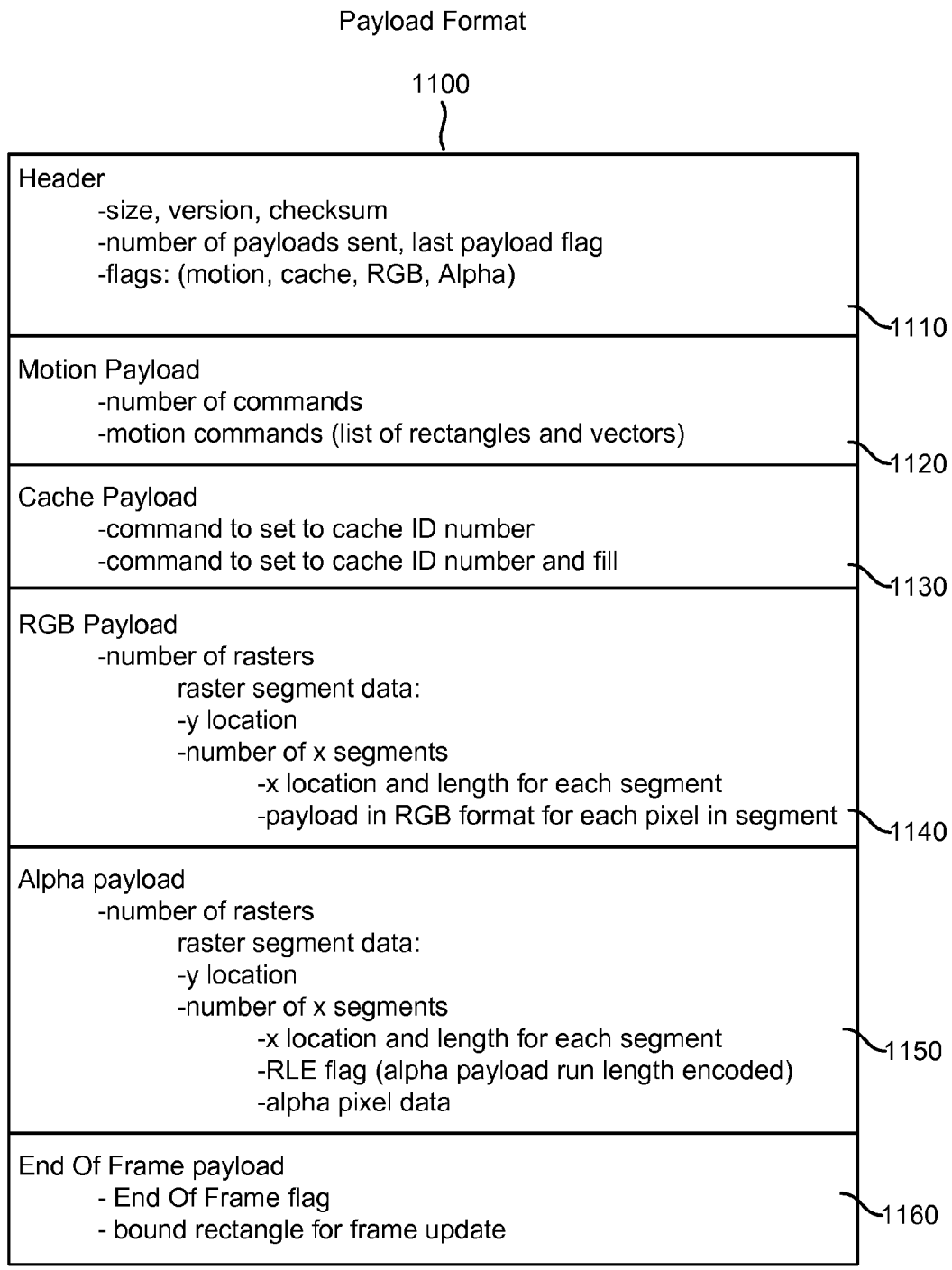
FIG. 11 is an example of a payload format.

After delta encoding is complete, the generated payload is transmitted to client 130 at step 280. One example format of a payload is illustrated in FIG. 11 and discussed in more detail below. In some embodiments, a single user interface graphical update may require several payloads, depending on the client cache and other factors. When sending multiple payloads, the last payload may be signified by a flag in the corresponding last payload. In some embodiments the last payload for a frame may also include a bounding shape to inform the UI Decoder 131 what areas of the current frame needs to be updated on the display device 135 to minimize the operations needed to display the frame. Client logic for receiving and decoding a payload is discussed in more detail below with respect to the method of FIG. 14.

Figure 3:
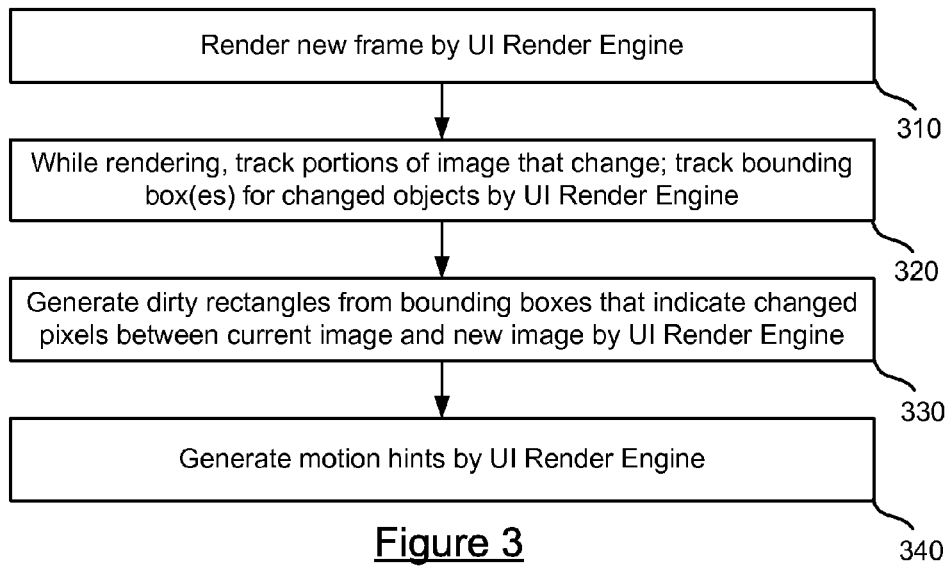
FIG. 3 is a flowchart of an embodiment of a method for generating new frame graphical data.

FIG. 3 is a flowchart of an embodiment of a method for generating new frame graphical data. In some embodiments, the method of FIG. 3 provides more detail for step 235 of the method of FIG. 2B. First, a new frame 115 is rendered by UI render engine 113. The new frame may be rendered by UI engine 113 in response to user input, an event, a command or some other data received from client 130. While rendering the new frame, UI render engine 113 tracks portions of the new frame that change (step 320). In some embodiments, bounding rectangle boxes (or other shapes) that contain changed objects are tracked Next, dirty rectangles are generated from the bounding boxes at step 330. The dirty rectangles contain one or more pixels that change between the current frame and the new frame. Motion hints are generated at step 340. A motion hint indicates detection of "motion" based on the position of an object in a current frame and a different position of the object in the new frame. A motion hint comprises a vector, an origin and data for the shape that moves, for example a length and width for a rectangle motion hint. Not all motion hints for objects detected to move during new frame rendering are translated into motion commands. For example, some motion hints collide with other motion hints are cannot be viewed in the current frame or new frame, additionally objects that rotate, scale or are transparent may not generate motion hints. Generating motion hints is discussed in more detail below with respect to FIG. 4.

Figure 4:
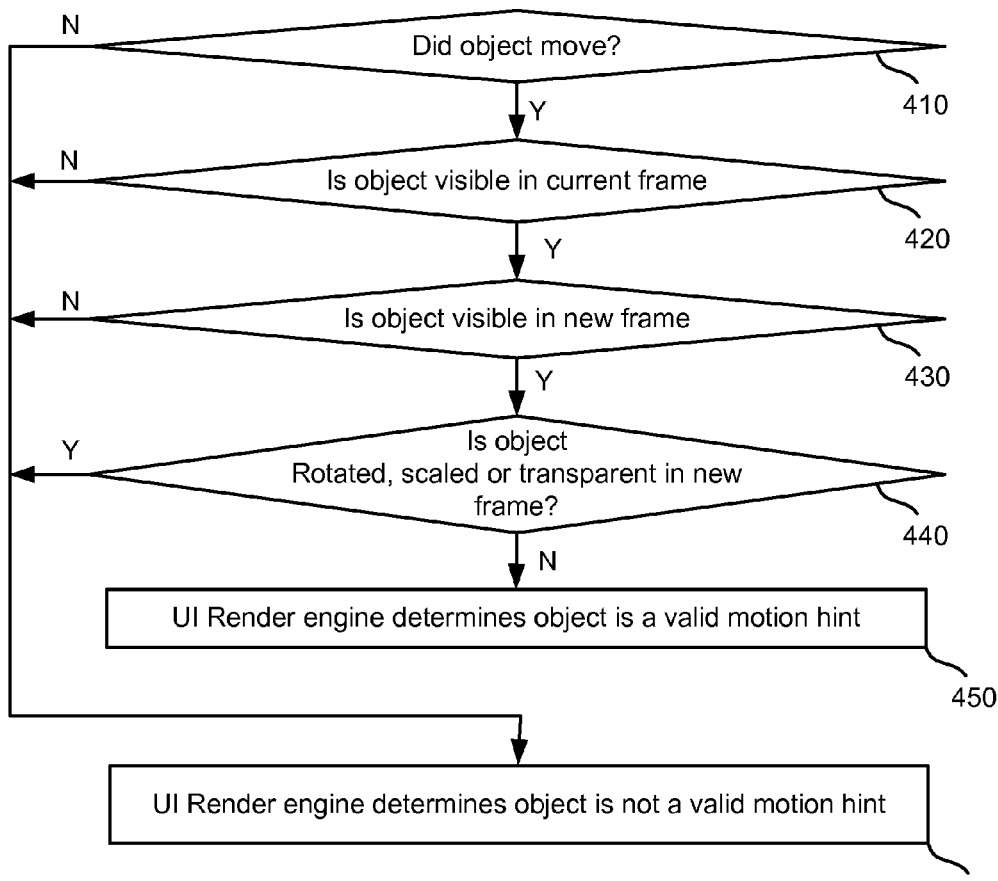
FIG. 4 is a flowchart of an embodiment of a method for generating motion hints by a render engine.

FIG. 4 is a flowchart of an embodiment of a method for generating motion hints. In some embodiments, the method of FIG. 4 provides more detail for step 310 of the method of FIG. 3 and is performed by UI render engine 113. First, render engine 113 makes a determination as to whether a particular object was detected to move during new frame rendering at step 410. An object has moved if the object was in a first position in a current frame and in a different location in the new frame. If a particular object did not move, then UI render engine 113 determines the object is not a valid motion hint at step 460.

If an object has been detected to move, a determination is made as to whether the object is visible in the current frame at step 420. For example, an object may be visible in a current frame (or not visible) as a result of layering features implemented in the current frame. If an object is not visible in a current frame, the object is not a valid motion hint (step 460). If the object is visible in the current frame, a determination is made as to whether the object is visible in the new frame at step 430. For example, an object may not be visible in a new frame if the object has been moved to a position outside the current frame or is behind an obstructing object or layer. If an object is not visible in the new frame, then the object is not a valid motion hint as indicated at step 460. If the object is visible in the new frame, a determination is made as to whether the object has been rotated or is transparent in the new frame at step 440. Objects that have been rotated or transparent are not processed as a motion hint. If the object has not been rotated or scaled, or is not transparent in the new frame, then the object is considered a valid motion hint at step 450.

Figure 5:
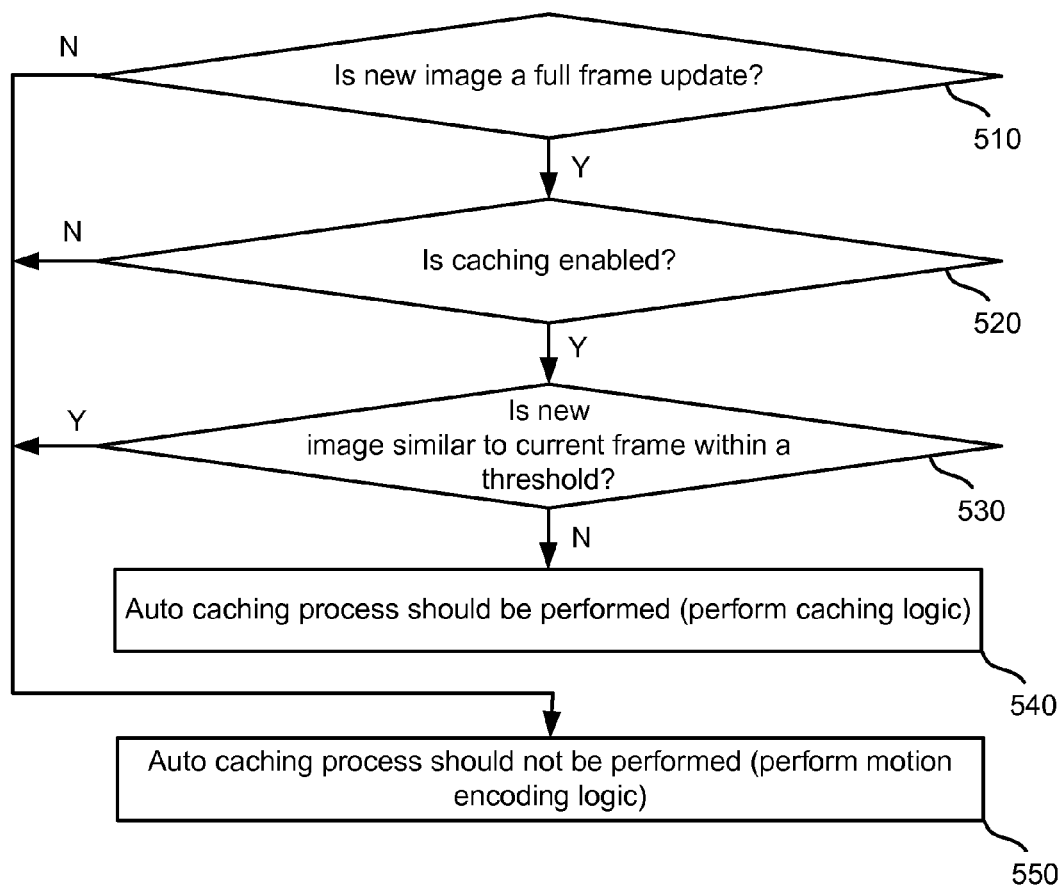
FIG. 5 is a flowchart of an embodiment of a method for determining if an auto caching process should be performed.

FIG. 5 is a flowchart of an embodiment of a method for determining if an auto caching process should be performed. In some embodiments, the method of FIG. 5 provides more detail of step 245 of the method of FIG. 2B. First, a determination is made as to whether the new frame is a full screen update at step 510. The determination may involve whether the sum of the dirty rectangles is equal to the size of the current frame. In some embodiments, the determination may involve whether the sum of the dirty rectangles meets a percentage threshold of the current frame, such as eighty percent or ninety percent, or meets some other threshold indicating that a majority of the frame requires a graphical update. If the new frame is not a full screen update, a determination is made that the auto caching process should not be performed at step 550. Not performing the auto caching process results in performance of motion encoding logic at step 260.

If the new frame is a full frame update, a determination is then made as to whether caching is enabled at step 520. Caching may be enabled if client 130 and server 110 both have cache buffers enabled to perform caching of one or more frames or frame portions. If caching is not enabled, the auto caching process is not performed as determined at step 550. If caching is enabled, a determination is then made as to whether the new frame is similar to the current frame within a threshold at step 530. In some embodiments, the threshold is calculated as a percentage of similar pixels to dissimilar pixels, for example a frame may be deemed similar if 75% (or some other value) of the pixels are similar pixels. In some embodiments, a similar pixel may be defined to be identical color values or merely a similar color value within a color tolerance level. If the current frame and new frame are similar within the threshold, then no changes to the cache are required and the auto caching process is not performed per step 550. In this case, auto caching is not performed because the differences between the current frame and the new frame are small and relatively inexpensive to encode into the payload. If the current frame and new frame are not similar within the threshold, a determination is made that the auto caching process should be performed at step 540. As a result of this determination, cache logic is performed at step 250 of the method of FIG. 2B.

Figure 6:
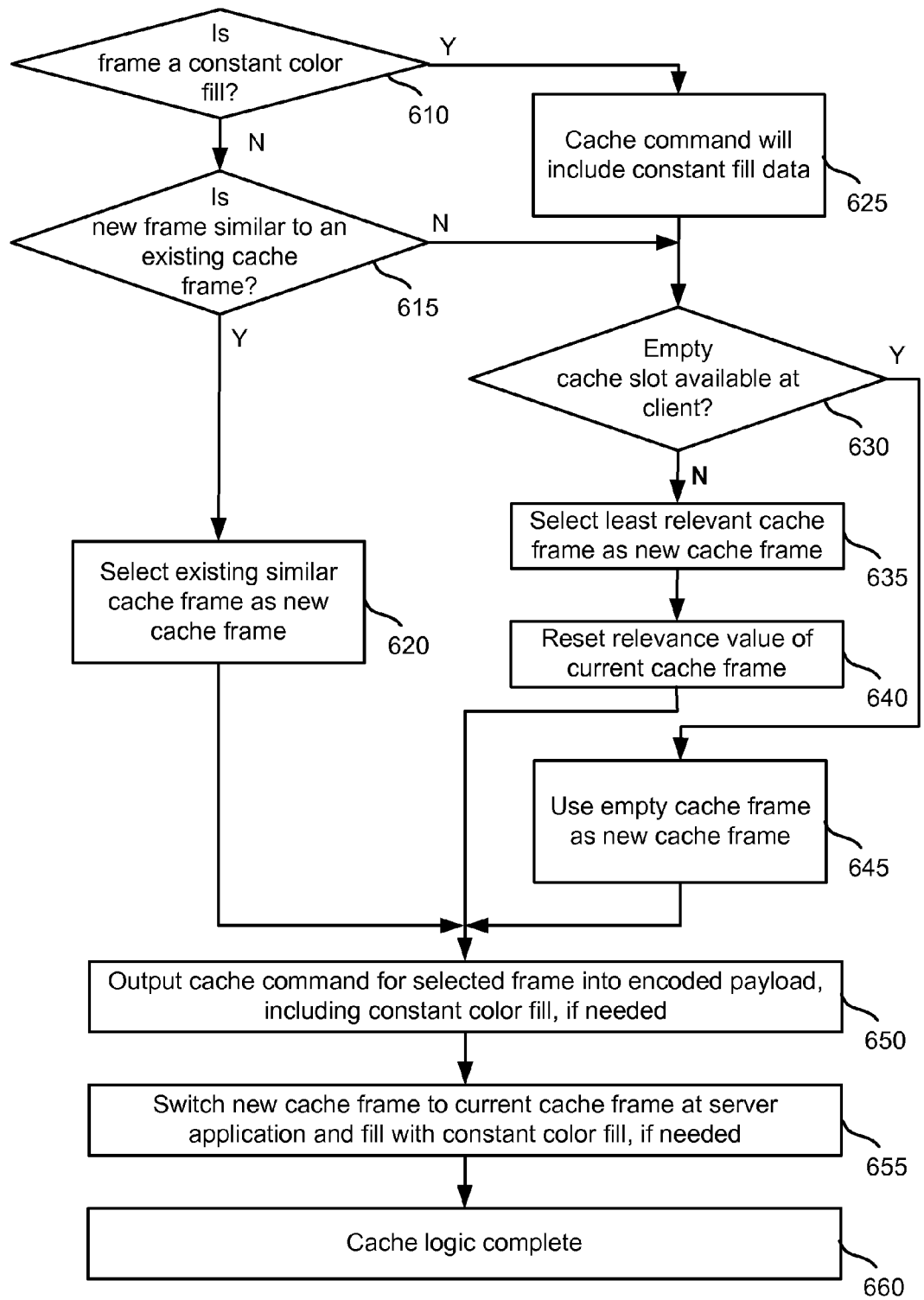
FIG. 6 is a flowchart of an embodiment of a method for performing cache logic.

FIG. 6 is a flowchart of an embodiment of a method for performing cache logic. In some embodiments, the flowchart of FIG. 6 provides more detail for step 250 of the method of FIG. 2B. First, a determination is made as to whether the new frame is a constant color fill at step 610. In some embodiments, the UI render engine may determine whether the new frame has a constant color fill and may provide this information to UI encoder 114. If the new frame is a constant color fill, then the cache command generated for a selected cache will include constant fill data as determined at step 625 and the method continues to step 630. If the new frame is not a constant color fill, a determination is made as to whether the new frame is similar to an existing cache frame at step 615. If the new frame is similar to an existing cache frame, then the existing cache frame is selected at step 620 as the new cache frame and the method of FIG. 6 continues to step 650. The existing cache frame is selected because the delta encoded difference between the new frame and the existing cache frame was determined to be similar and will result in a smaller and more efficient payload to send to the client.

If the new frame is not similar to an existing cache frame, a determination is made as to whether empty cache slots are available at client 130 at step 630. As illustrated in FIG. 1, server 110 maintains a copy of the cached frames maintained at client 130. Therefore, the server has knowledge of the cached frames maintained at client 130 and whether any cache slots are empty at client 130. If there is an empty cache slot at client 130, the empty cache slot is used as the new cache frame at step 645. Using an empty cache frame may include encoding one or more cache commands to set the empty cache slot as the current frame slot. The method of FIG. 6 then continues to step 650.

If there are no empty cache slots at client 130, the least relevant cache frame is selected as the new cache frame at step 635. The relevancy of a cache frame may be determined in several ways. In some embodiments, the relevancy may be determined by the last time a cached frame was used (for example, determined via timestamp) in the rendered user interface graphics. In some embodiments, the relevance may be determined by a relevancy value indicating the number of times a cached frame has been used relative to the other cache frames, or may be simply based on the how recently the cache has been referenced. Alternately, it could be determined by other means, such as a pre-determined ranking of pre-rendered cache content. Other mechanisms for determining cache frame relevancy can be used as well, and are considered within the scope of the present technology.

After selecting the least relevant cache frame as the new cache frame, the relevance value of the current frame is reset at step 640. The relevance value is reset because new frame data will be encoded into the payload and placed in the cache slot associated with the lowest relevancy cache frame, thereby overwriting the previous cache frame in that slot. The new cache frame placed in the slot should not inherit the previous relevancy value, but should be associated with a reset relevancy value. The method of FIG. 6 then continues to step 650.

A cache command for the selected frame is output into the encoded payload at step 650. The cache command way include constant color fill data if needed based on the determination made at step 610. The output cache command may include a command to set the current frame to a cached frame contained in a particular cache as identified by a cache identifier (cache ID number), and may include a color fill data. After outputting the cache command to the payload, the new cache frame is switched to the current cache frame at server 110 at step 655. Similar to step 650, the new cache frame may be filled with a constant color if fill data was included in the payload cache command at step 650. After switching the new cache frame to the current cache frame at the server, cache logic is complete at step 660.

Figure 7A:
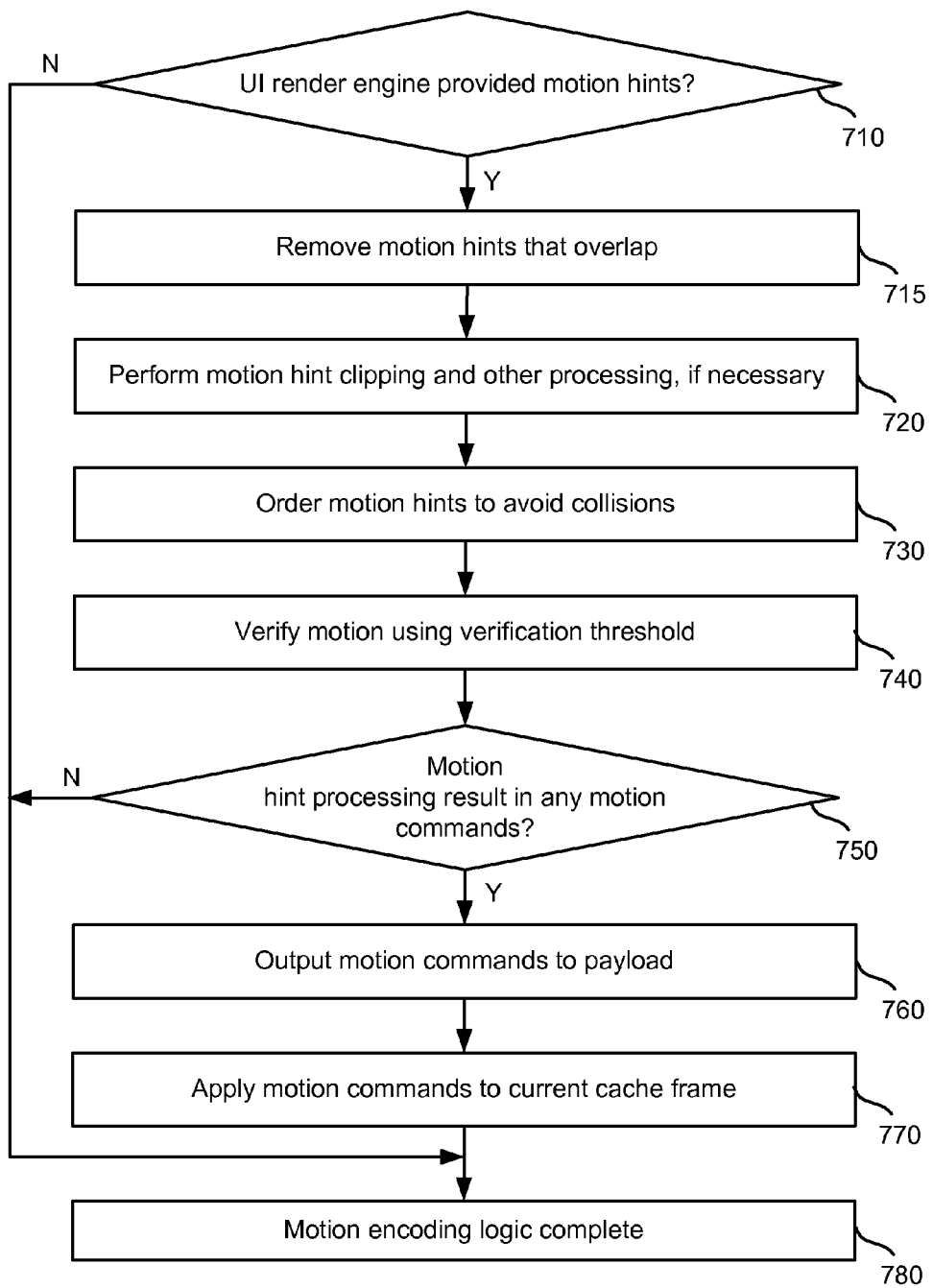
FIG. 7A is a flowchart of an embodiment of a method for performing motion encoding logic.

If caching logic is not performed in the method of FIG. 2B, motion encoding logic is performed. FIG. 7A is a flowchart of an embodiment of a method for performing motion encoding logic. In some embodiments, the method of FIG. 7A provides more detail for step 260 of the method of FIG. 2B.

First, a determination is made as to whether the UI render engine 113 provided motion hints at step 710. Providing motion hints by UI render engine 113 was discussed above with respect to step 340 of the method of FIG. 3. If the UI render engine did not provide motion hints, motion encoding logic is complete at step 780 and no motion commands are generated.

Figure 7B:
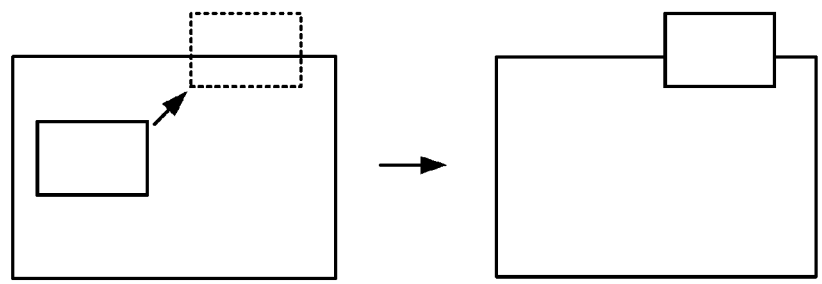
FIG. 7B is an example of rectangle movement between a current frame and a new frame.
Figure 7C:
FIG. 7C is an example of rectangle clipping.
Figure 7D:
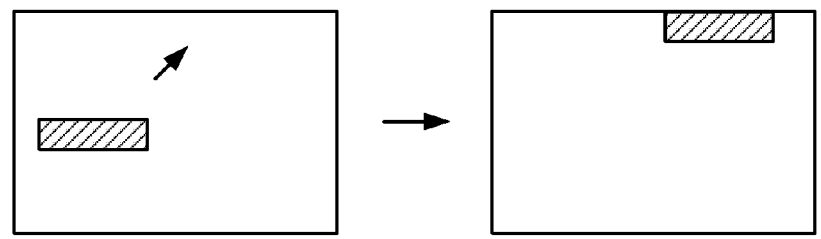
FIG. 7D is an example of a modified rectangle movement between a current frame and a new frame.

If UI render engine 113 provided one or more motion hints, then any of several steps can be performed to reduce the number of motion hints to make the motion encoding process more efficient. Motion hints that overlap are removed at step 715. In some embodiments, the overlapping motion hint having the smaller rectangle is removed from the motion hint list. Motion hint clipping is performed if needed at step 720. Motion hint clipping involves removing or "clipping" a portion of a rectangle associated with a motion hint because the portion is positioned off the frame in the destination. Conceptual steps of performing clipping of motion hints are illustrated in FIGS. 7B-7D. Motion hints in the list are ordered to avoid collisions at step 730. Additionally, in some embodiments, if more than one motion hint result in the same destination, all but one of those colliding motion hints are removed. In some embodiments, two or more motion hints having a destination rectangle that collides with a source rectangle of another motion hint are set to execute in an order that minimizes the overwriting of source rectangles before the motion command for source rectangle is applied.

Motion verification is then performed using a verification threshold at step 740. The motion verification verifies that the rectangle associated with the motion hint would be most efficiently rendered by a motion command combined with delta encoding as opposed to delta encoding alone. In some embodiments, motion verification compares each pixel between a source rectangle and a destination rectangle and increments a pass counter or fail counter based on whether the pixels match (in some embodiments, within a comparison threshold). The verification is based on which of the pass counter or fail counter satisfy a corresponding threshold first, and motion commands are generated for motion hints that pass the verification process. Motion verification is discussed in more detail below with respect to the method of FIG. 8A.

Motion commands are output to a payload at step 760. Motion commands are generated for those motion hints that survive the motion hint reduction steps and satisfy a verification process. In some embodiments, a motion command may consist of a vector and rectangle data, including an origin, length and width. An example of the format of motion commands in a payload is illustrated by motion payload 1120 of the payload of FIG. 11.

After outputting the motion commands to the payload, the motion commands are applied to the current cache frame maintained at server 110 at step 770. The motion commands are applied to the current frame at the server in order to enable the delta encoder to correctly determine what needs to be encoded in the modified current frame in order to render the new frame. If the motion commands were not applied to the current cache frame at server 110, delta encoding the unmodified current frame against the new frame would result in much more encoded delta data included in the payload (which would affect processing of the thin client) and an unnecessary increase in network load. After applying the motion commands to the current cache frame, the motion encoding logic is complete at step 780.

FIG. 7B is an example of object movement. FIG. 7B includes a current frame (on the left) and new frame (on the right). In the current frame, a source rectangle is shown in solid line and expected destination of the rectangle in a dotted line. In the new frame, the rectangle destination is shown after the current frame has been modified with a motion command. As illustrated, the rectangle moves to a position in the new frame such that a portion of the rectangle is no longer contained within the frame. The rectangle as a whole is not a good candidate for a motion vector as is because a portion of the rectangle is moved to a position outside of the frame.

FIG. 7C illustrates a clipping process that can be performed on the rectangle. FIG. 7C illustrates an original rectangle on the left, the portion of the rectangle to be clipped in the middle, and resulting clipped rectangle on the right. In the middle of FIG. 7C, the portion of the rectangle to remain in the motion hint after the rectangle is clipped is shaded. The shaded rectangle on the right in FIG. 7C represents the result of the clipping of the original rectangle.

FIG. 7D illustrates the applying a motion command to the frame having the clipped rectangle. Previously, a portion of the moving rectangle was positioned outside the frame boundary in the new frame. In FIG. 7D, the moving rectangle has been modified such that only the portion which is contained within the new frame is processed with a motion hint. Thus, the portion of the object which was previously located outside the new frame has been clipped from the motion hint.

Figure 7E:
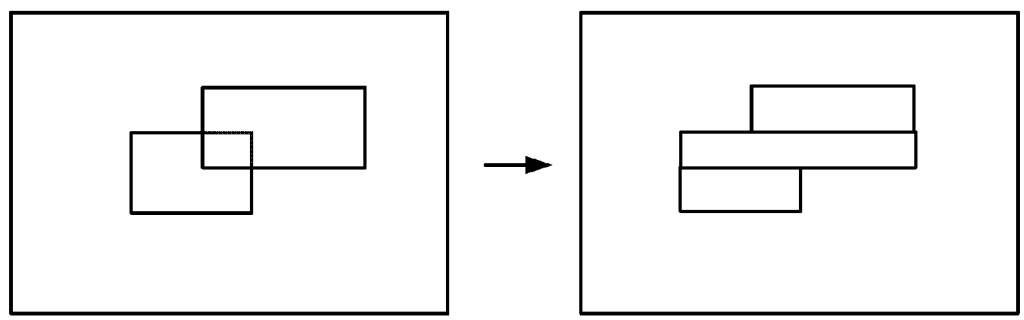
FIG. 7E is an example of reconfiguring overlapping dirty rectangles within a user interface.

FIG. 7E is an example of modified dirty rectangles. FIG. 7E includes a frame containing two overlapping dirty rectangles on the left and a frame of three adjacent dirty rectangles on the right. The two overlapping rectangles in the frame to the left partially overlap. Rather than encoding the overlapping portion twice, the two rectangles are broken up into three adjacent rectangles which do not overlap as shown in the frame to the right. In some embodiments, when reconstructing overlapping rectangles, the rectangles created to represent the overlapping rectangles are constructed to maximize a raster length for payload efficiency (thus, rectangles are chosen to maximize length rather than height). When the three adjacent rectangles are encoded, there will be no overlapping encoding and each rectangle can be represented by wide lengths of pixel segments described by origin and length.

Figure 8A:
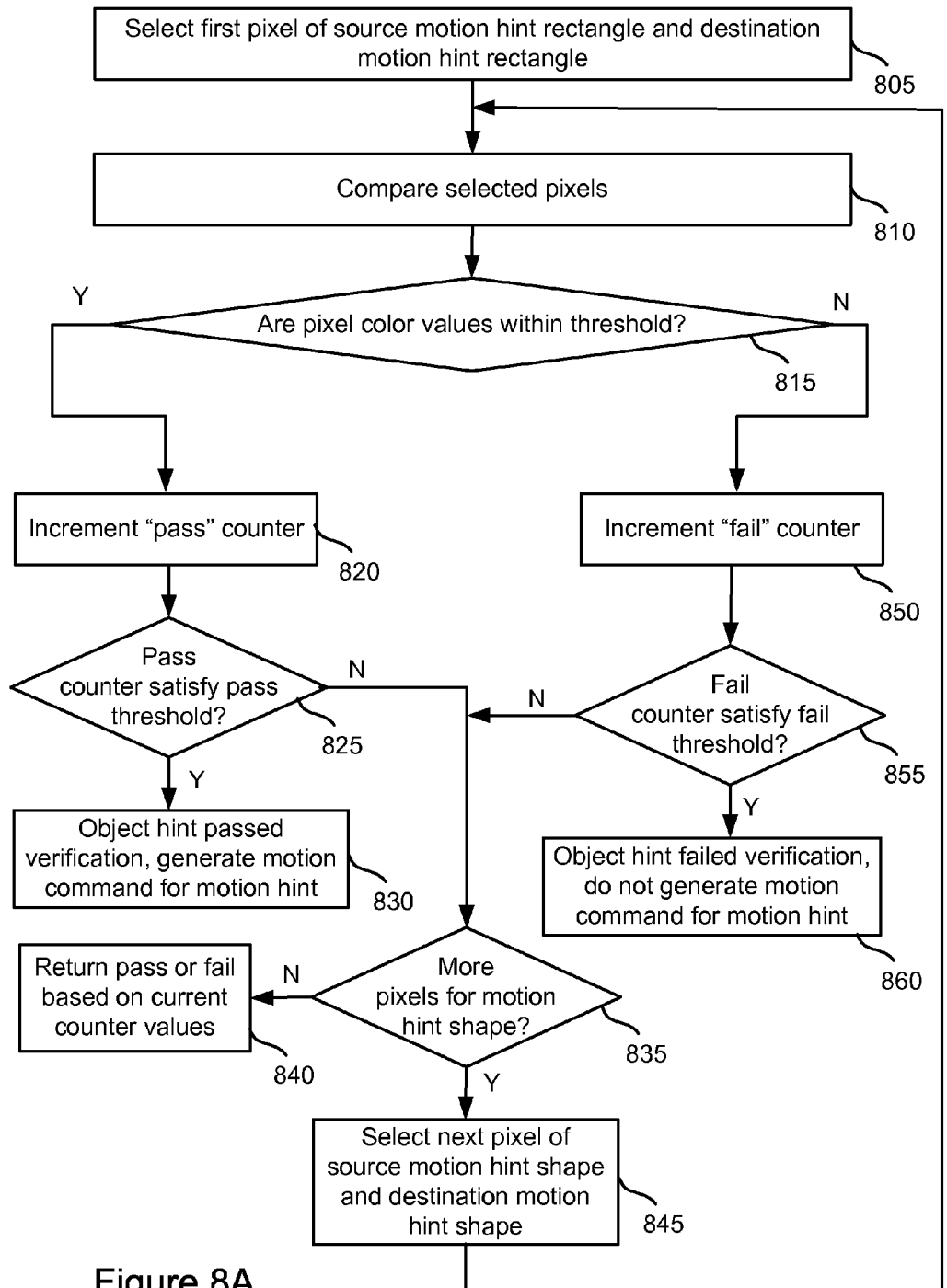
FIG. 8A is a flowchart of an embodiment of a method for verifying motion using a threshold.

As discussed with respect to the method of FIG. 7A, motion commands require that motion hints pass a verification process. FIG. 8A is a flowchart of an embodiment of a method for verifying motion using a threshold. In some embodiments, the method of FIG. 8A provides more detail for step 740 of the method of FIG. 7A. To verify motion associated with a motion hint, the method of FIG. 7B determines whether it would be more efficient to encode the differences of the moving rectangle or apply a motion command to the moving rectangle and then encode the resulting differences. First, a first pixel of the source motion hint rectangle and destination motion hint rectangle is selected at step 805. The selected pixels are then compared at step 810. A determination is then made as to whether pixel color values between the compared pixels are within a threshold at step 815. In some embodiments, the threshold may be zero difference for a lossless new frame. In some embodiments, the threshold may be seventy percent, eighty percent, ninety percent of color matching, or some other tolerance level of color similarity. If the pixel color values are not within the threshold, a fail counter is incremented at step 850 and a determination is made as to whether the fail counter current value satisfies a fail threshold at step 855. Selecting a fail threshold value is discussed below. If the fail counter satisfies the fail threshold, the object hint has failed the motion verification process and a motion command is not generated for the motion hint at step 850. If the fail counter does not satisfy the fail threshold, the method continues to step 835. In some embodiments, the determination of a valid move can be determined by calculating the total cost of the embedded delta payload without the motion applied and comparing to the total cost of the embedded payload with the motion applied, and deciding based on which results in a smaller payload.

If the pixel color values are within a threshold at step 815, a pass counter is incremented at step 820 and a determination is made as to whether the current value of the pass counter satisfies a pass threshold at step 825. If the pass counter value satisfies the pass threshold, the object hint has passed the verification process and a motion command is generated for the motion hint at step 830. If the pass counter does not satisfy the pass threshold, the method continues to step 835.

In some embodiments, the pass threshold and fail threshold may be related in that they add up to one hundred percent. Thus, a pass threshold may have a value of sixty percent of rectangle pixels and the fail counter may have a value of forty percent of the rectangle pixels. In some embodiments, both the pass threshold and fail threshold may be set to fifty percent of the pixels. In any case, the system determines whether each counter has reached a pixel count which satisfies the threshold percentage of total pixels in the rectangle. In some embodiments, the pass threshold and fail threshold may be selected based on factors of network resources, type of user interface graphics which are being encoded, motion encoding and delta encoding resources, and other data.

At step 835, a determination is made as to whether more pixels exist in the motion hint rectangle (or other shape). If more pixels exist, the next pixel in the source motion hint rectangle and destination motion hint rectangle are selected and the method of FIG. 8A continues to step 810. If no further pixels exist in the motion hint, a pass or fail value is returned based on current counter values.

Figure 8B:
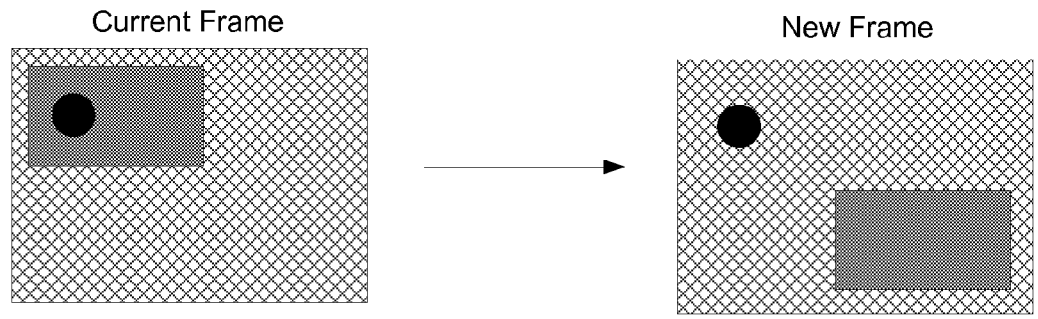
FIG. 8B is an example of a current frame and a new frame depicting a moving rectangle.
Figure 8C:
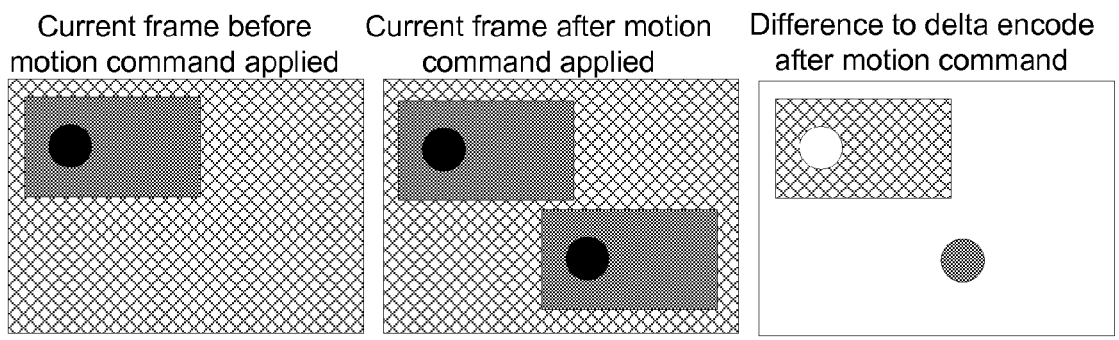
FIG. 8C is an example of a current frame wherein a motion command and delta encoding are applied.
Figure 8D:
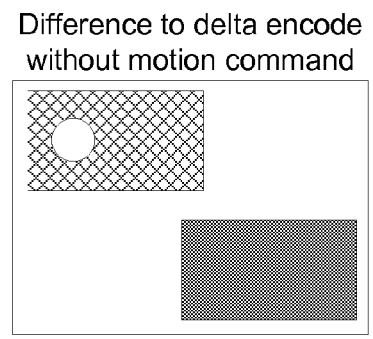
FIG. 8D is an example of a current frame wherein delta encoding is applied.

In some embodiments, the destructive motion compensation process of FIG. 8A determines whether it is more efficient to apply motion commands and delta commands to a current frame rather than just apply delta commands. FIGS. 8B-8D an example of the differences in between these two options with respect to an example frame. FIG. 8B is an example of a current frame and a new frame depicting a moving rectangle. The current frame on left in FIG. 8B includes a shaded background, a rectangle and a circle within the rectangle on the upper left portion of the frame. In new frame towards the right of FIG. 8B, the location of the circle has not changed but the rectangle has moved from the upper left to the lower right position of the frame.

FIG. 8C is an example of a progression of the current frame as motion command and delta encoding are applied. Of the three frames pictured in FIG. 8C, the left frame is the same as the current frame pictured in FIG. 8B. The center frame indicates the current frame after a motion command has been applied to the shape comprising the rectangle. Note that although only the rectangle moves to the new frame in FIG. 8B, the data comprising the rectangle in the current frame contains the circle as well, therefore creating an invalid state of the contents of the frame, which will be repaired by the delta encoder. Thus, the motion command moves a copy of the pixel data within the rectangle from the source position in the current frame to the destination position of the rectangle in the new frame. Next, the frame on the right indicates pixel data that the delta encoder determines needs to be encoded. The encoded data in the frame to the right is the encoding that the center frame in FIG. 8C requires to be changed into the new frame in the right side of FIG. 8B. In this example, delta encoder replaces the background where the object was moved, and repairs the invalid state created by the motion of frame data.

FIG. 8D is an example of a current frame wherein only delta encoding is applied to change the current frame of FIG. 8B into the new frame of FIG. 8B. As can be seen, the delta encoding requires that the destination location of the rectangle be encoded to match the background of the new frame (except for the location of the circle) and that the entire portion of the rectangle is encoded. The difference in encoding with and without encoding motion commands can be seen by comparing the encoded portions of the frame of FIG. 8D and the frame in the right of FIG. 8C. The frame in the right of FIG. 8C requires the encoding the source position of the rectangle (except for the position of the circle) as in FIG. 8D, but requires much less encoding to complete the pixels in the vicinity of the rectangle destination (encoding the small circle rather than the entire rectangle).

Some embodiments may verify motion by calculating the size of the payload produced both when a move is performed and when the move is not performed, and determines which option (delta encoding with or without the move operation) would produce the lowest delta encoded payload.

Figure 8E:
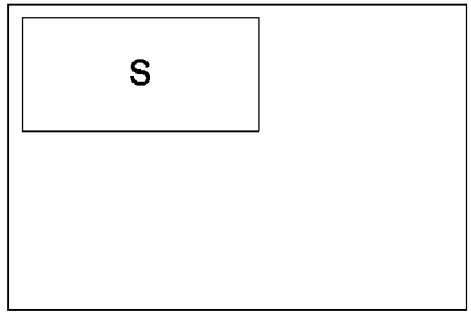
FIGS. 8E-8F are examples of data in a current frame and new frame used to verify whether to apply motion commands.
Figure 8E:
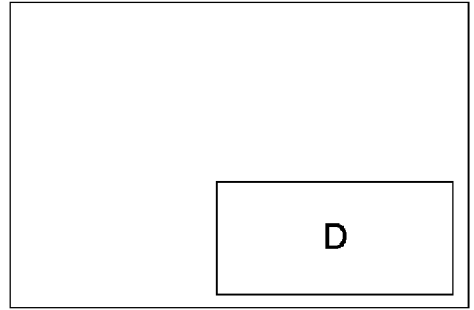

FIG. 8E shows a current frame and a new frame and contains source rectangle S and destination rectangle D. The two rectangles represent the areas specified by a motion hint and indicate a movement in a UI element between the current frame and the new frame. In this example, an object in the UI framework was rendered at source rectangle S in the current frame and was then rendered at destination location D in the new frame.

Figure 8F:
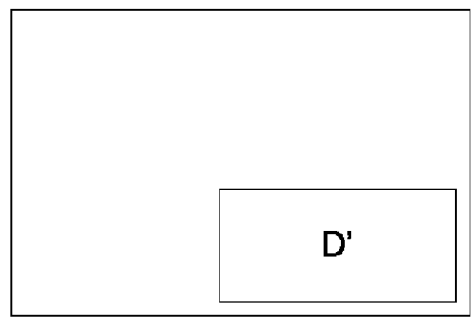
Figure 8F:
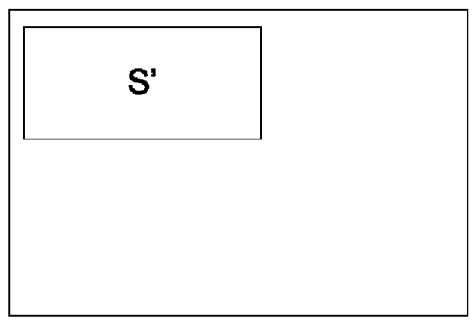

FIG. 8F shows the same current frame and the new frame depicted in FIG. 8E and contains destination rectangle D' and source rectangle S'. The rectangle D' presents the pixel data in the current frame which would be overwritten by the contents of rectangle S if a move is applied. The rectangle S' represents the new pixel data in the new frame which will be encoded into rectangle S when encoding is applied.

To calculate the cost of not performing the move operation for the motion hint and only using delta encoding, the following formula can be used: (S–S')+(D'–D), where subtraction indicates an operation where each pixel is compared at identical pixel locations in the two areas of the current frame and new frame. The result of the operation would be number of pixels deemed non-similar. To compute the cost of performing the move prior to delta encoding, this formula can be used: (S–S')–(S–D), which reflects applying the motion command by replacing D' with S. To decide whether or not the move will result in the smallest possible payload, the following logic applies: Move=(((S–S')+(D'–D))>((S–S')+(S–D))). This reduces to: Move=((D'–D)>(S–D)).

Figure 9:
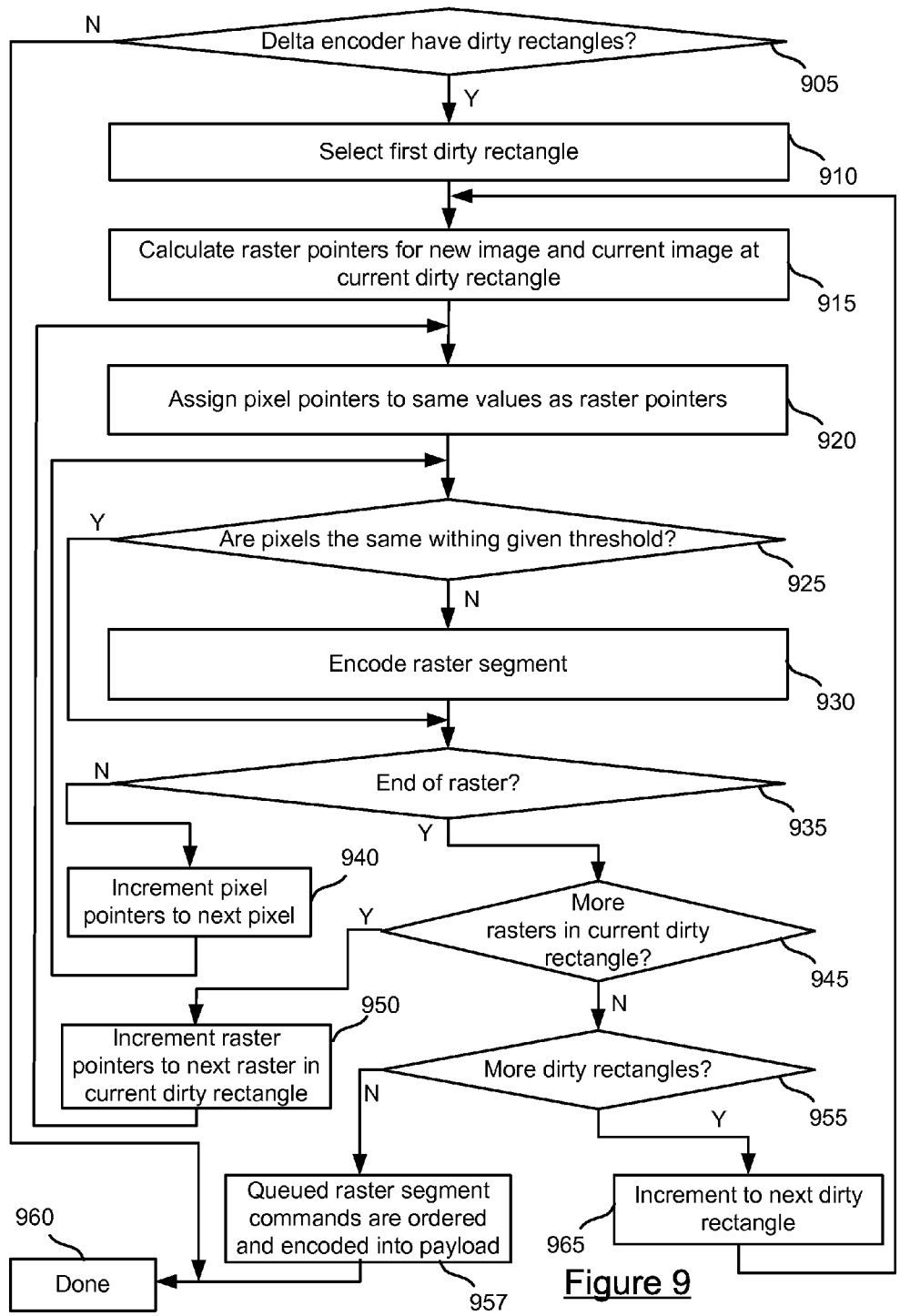
FIG. 9 is a flowchart of an embodiment of a method for performing delta encoding.

After performing motion encoding, data is delta encoded into the payload. The data to be delta encoded may include one or more of RGB data, alpha data, another format of graphical data, or some other data. FIG. 9 is a flow chart of an embodiment of a method for performing delta encoding for RGB data. In one embodiment, the method of FIG. 9 provides more detail for step 270 of the method of FIG. 2. First, a determination is made as to whether delta encoder 119 has access to dirty rectangles at step 905. The dirty rectangles may be generated by UI render engine 113. If the delta encoder does not have access to any dirty rectangles, the method of FIG. 9 is complete at step 960 because there is no data indicating any change between a current frame and a new frame.

If the delta encoder does have access to dirty rectangles, the first dirty rectangle is selected at step 910 and raster points are calculated at the selected dirty rectangle for the new frame and current frame at step 915. Raster pointers are calculated to point to the first pixel of the first raster in dirty rectangle position in both the new frame and the current frame. Pixel pointers are then assigned to the same values as the raster pointers at step 920.

A determination is made as to whether the pixels indicated by the pixel pointers are the same at step 925. The pixels are the same if they have the same RGB data values. In some embodiments, the determination may involve determining if the RGB values are within a certain threshold rather than whether the color values match exactly. If the pixels match (optionally, within a threshold) at step 925, the method continues to step 935. If the pixels do not match, a difference has been detected and a raster segment is encoded at step 930. Encoding a raster segment may include determining the length of pixel pairs along which the pixel values differ from the current raster in the selected dirty rectangle. In some embodiments, a raster segment may include a string of pixels pairs that do not differ (or not meeting the difference threshold) to avoid fragmenting the delta encoded raster segments. Once the end of a raster segment is determined, the RGB data for the raster segment is copied into the payload and applied to the current frame maintained at the server. Encoding a raster segment is discussed in more detail below with respect to the method of FIG. 10A with respect to RGB data and the method of FIG. 10B with respect to alpha data.

A determination is made at step 935 as to whether the end of the raster is detected at step 935. If the end of a raster is not detected, the pixel pointers are incremented to the next pixel in the raster at step 840 and the method continues to step 925. If the end of the raster is detected, a determination is made as to whether more rasters exist in the current dirty rectangle at step 945. If more rasters exist in the current dirty rectangle, the raster pointers are incremented to the next raster at step 950 and the method continues to step 920. Incrementing raster pointers will move the pointer to the next raster in the dirty rectangle. If there are no more rasters at step 945, a determination is made as to whether more dirty rectangles exist at step 955. If delta encoder 119 has access to more dirty rectangles to analyze, encoder 119 increments to the next dirty rectangle at step 965 and the method returns to step 915. If there are no further dirty rectangles to process, contents of a raster segment cache command queue and raster segment motion command queue are ordered and embedded into the payload at step 957. One or more commands may be stored in the raster segment cache command queue and raster segment motion command queue depending on if raster segment caching or motion detection is enabled and other factors discussed with respect to FIGS. 10B-10D. Executing cached commands to write RGB data into a payload is discussed in more detail below with respect to FIG. 10D.

After the queued commands are written RGB delta encoding is complete at step 960.

Figure 10A:
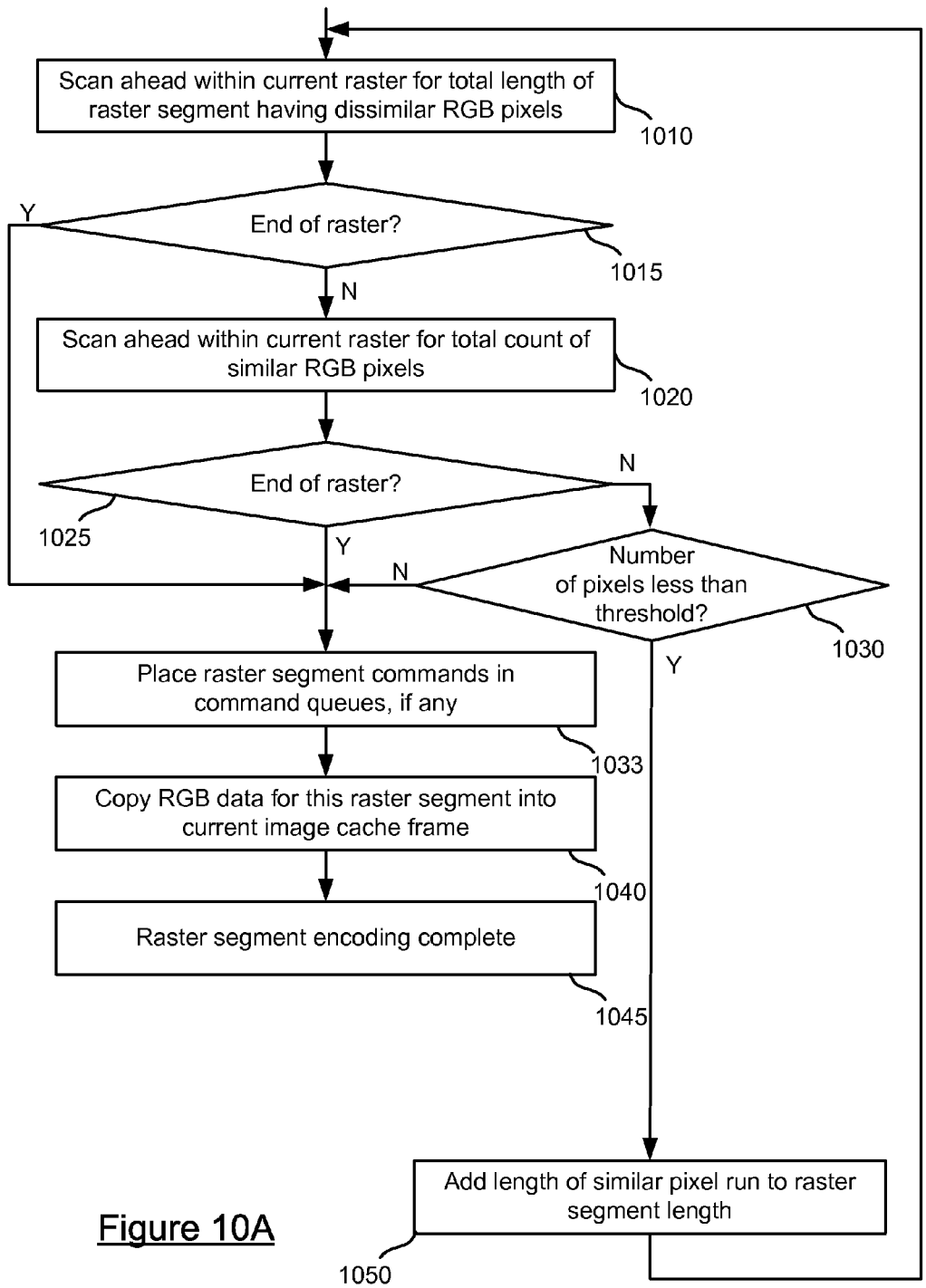
FIG. 10A is a flowchart of an embodiment of a method for encoding raster segments for RGB color data.

Encoding a raster segment at step at step 930 in the method of FIG. 9 may include detecting a segment of pixels along a raster and encoding the set of pixels in the payload. The pixels may include pixels that are different between a current frame and new frame and, in some embodiments, pixels that are the same. FIG. 10A illustrates a flowchart of an embodiment of a method for encoding raster segments for RGB data as in step 930 of FIG. 9.

Upon detecting a pair of pixels that differ at step 925 of FIG. 9, delta encoder scans forward along the current raster to determine the total length of the raster segment having dissimilar pixels at step 1010. The scan mere detects the difference between pixels in the raster and does not record the pixel values at this time. When the scan has completed, delta encoder 119 determines whether the end of the length of the segment is the end of the current raster at step 1015. If the end of the segment corresponds to the end of the segment, the method continues to step 1033 where the RGB raster segment commands are placed in one or more raster segment command queues (discussed below). If the end of the segment is not the end of the raster, then a similar pixel has been detected. At this point, delta encoder 119 scans ahead in the raster to determine the total count of pixels that are the same at step 1020. Once the end of the run of similar pixels is detected, a determination is made as to whether the end of the similar pixels corresponds to the end of the current raster at step 1025. If the end of the raster has been detected, the method continues to step 1035.

If the end of the raster has not been detected, then the run of similar pixels has ended with the detection of a pair of different pixels in the raster. At this point, a determination is made as to whether the number of pixels comprising the run of similar pixels is less than a threshold at step 1030. This determination decides whether the run of similar pixels is small enough such that the similar pixels may be included in the current raster segment. In some embodiments, the similar pixel length threshold may be selected based on factors of frame resolution, networking bandwidth, client memory size, and other factors. For example, the similar pixel length threshold in step 1030 may be two pixels, three pixels, or some other number of pixels. If the number of similar pixels is less than the threshold, the length of the similar pixel run is added to the raster segment length at step 1050 and the process return to step 1010. If the number of similar pixels is less than the threshold, the method continues to step 1033. In inclusion of small runs of similar pixels in the raster segment avoids unnecessary fragmentation of the raster segment, which allows for more efficient storage of the delta data in the payload.

Raster segment commands are placed into one or more command queues, if any, at step 1033. Placing raster segment commands in a queue may include cache commands such as the addition, removal or use of a cached raster segment, as well as specifying a motion command of a raster segment. Placing raster segment commands in a queue is discussed in more detail below with respect to FIGS. 10B-C. After placing any raster segment commands in one or more queues, the method continues to step 1040.

Figure 10B:
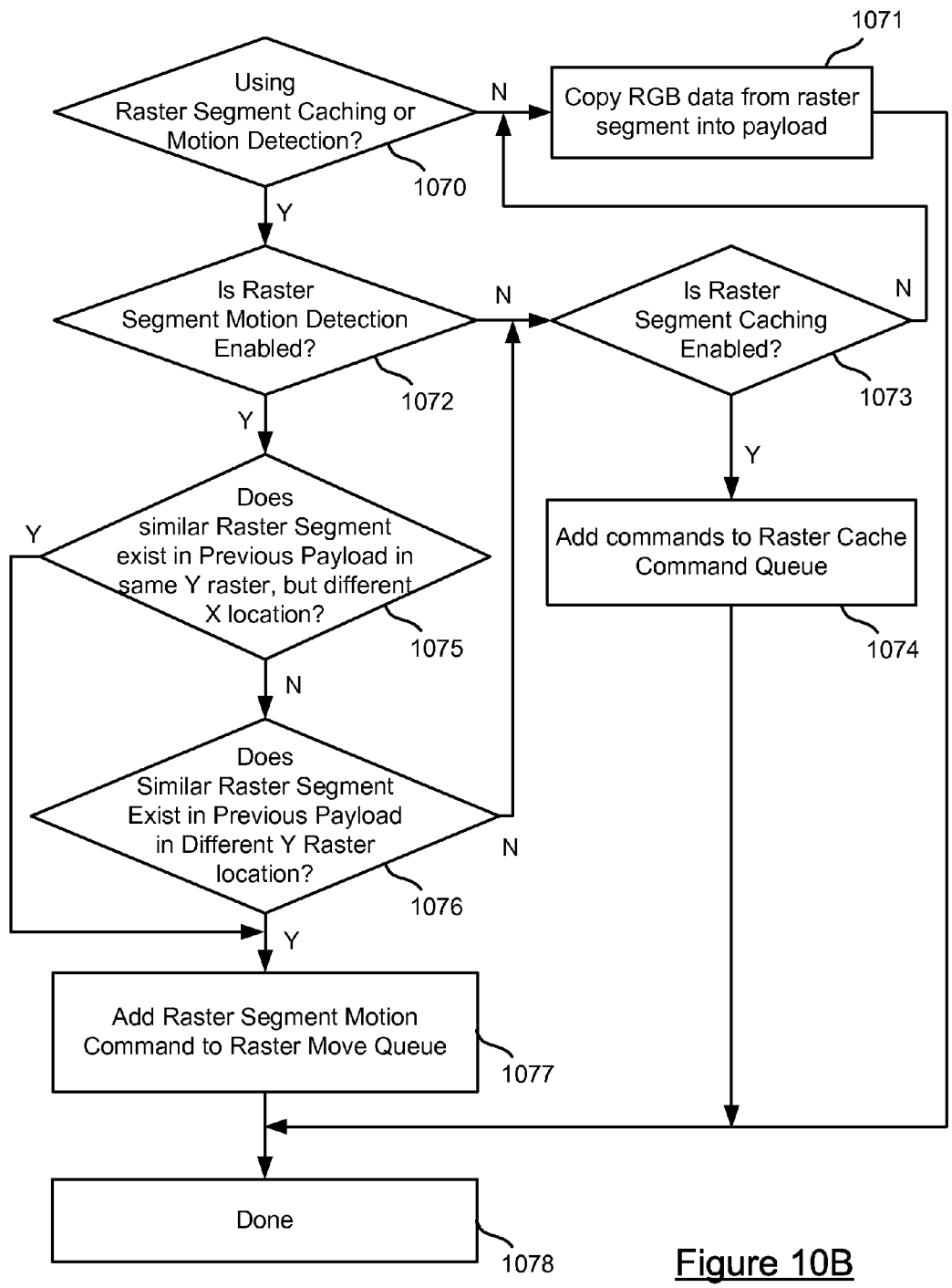
FIG. 10B is a flowchart of an embodiment of a method for queuing commands.

After placing raster segment commands in command queues, the RGB raster segments are applied to current frame 116 maintained at server 110 at step 1040. By applying each raster segment to the copy of the current frame, the UI encoder may update the current frame to reflect the current frame one raster segment at a time. By the time UI encoder has processed every dirty rectangle, the current frame RGB data should be modified into the new frame. After updating the current frame with the raster segment data, the raster segment encoding is complete at step 1045 and the RGB delta encoding process returns to step 935 of the method of FIG. 9. FIG. 10B is a flowchart of an embodiment of a method for queuing raster segment commands. The method of FIG. 10B provides more detail for step 1033 of the method of FIG. 10A. First, a determination is made as to whether raster segment caching or motion detection is used at step 1070. If neither raster segment caching nor motion detection are used, then RGB data is copied from the current raster segment into the payload at step 1071 and the method is done at step 1069. If either raster segment caching or motion detection are used, a determination is made as to whether raster segment motion detection is enabled at step 1072. When raster segment motion detection is enabled, the current system may identify whether a current raster segment has existed in a previous payload. If raster segment motion detection is not enabled, then a determination is made as to whether raster segment caching is enabled at step 1073. Raster segment caching may be enabled if a client is configured to cache raster segments in memory. If raster segment caching is not enabled, then RGB data is copied from the current raster segment into the payload at step 1071 and the method is done at step 1069. If raster segment caching is enabled, commands are added to the raster cache command queue at step 1074. Adding commands to the raster cache command queue is discussed in more detail below with respect to the method of FIG. 10C. The method of FIG. 10B is done at step 1069.

If raster segment motion detection is determined to be enabled at step 1072, one or more comparisons are made with respect to the current raster segment. First, a determination is made as to whether a raster segment exists in the previous payload in the same raster but a different X location within the same raster at step 1075. This determination effectively detects horizontal movement of the raster segment. The determination can be made by parsing the previous payload to detect whether a qualifying raster segment exists in the specified raster. A qualifying raster segment may be one that exactly matches the current raster segment (for lossless frame rendering) or, in some embodiments, a raster segment that matches the current raster segment within some threshold (for lossy frame rendering). The threshold may be an acceptable difference for an overall average pixel value for the rasters, an acceptable difference range for each pixel, or some other threshold. If a qualifying raster segment exists in the previous payload, a raster segment motion command is added to the raster segment motion command queue at step 1077. The raster segment motion command may specify the raster segment in the previous payload and specify the location in the new frame to copy the selected raster segment. The method of FIG. 10B is then done at step 1078.

If a raster segment does not exist in the previous payload in the same raster, a determination is made as to whether a raster segment exists in the previous payload in a different raster location at step 1076. The determination can be made by parsing the previous payload to detect whether a qualifying raster segment exists anywhere in the payload. Similar to step 1075, a qualifying raster segment may be one that exactly matches the current raster segment (for lossless frame rendering) or, in some embodiments, a raster segment that matches the current raster segment within some threshold (for lossy frame rendering). If a qualifying raster segment exists in the previous payload, a raster segment motion command is added to the raster segment motion command queue at step 1077 and the method of FIG. 10B is done at step 1078. If a qualifying raster segment does not exist at step 1076, the method of FIG. 10B returns to step 1073 where a determination is made as to whether raster segment caching is enabled.

In some embodiments, step 1075 is performed as an optimization for faster performance. This optimization may quickly detect horizontal motion of a raster segment and can be performed more quickly than parsing an entire payload for a matching raster segment. However, to perform both of steps 1075 and 1076 is optional.

Figure 10C:
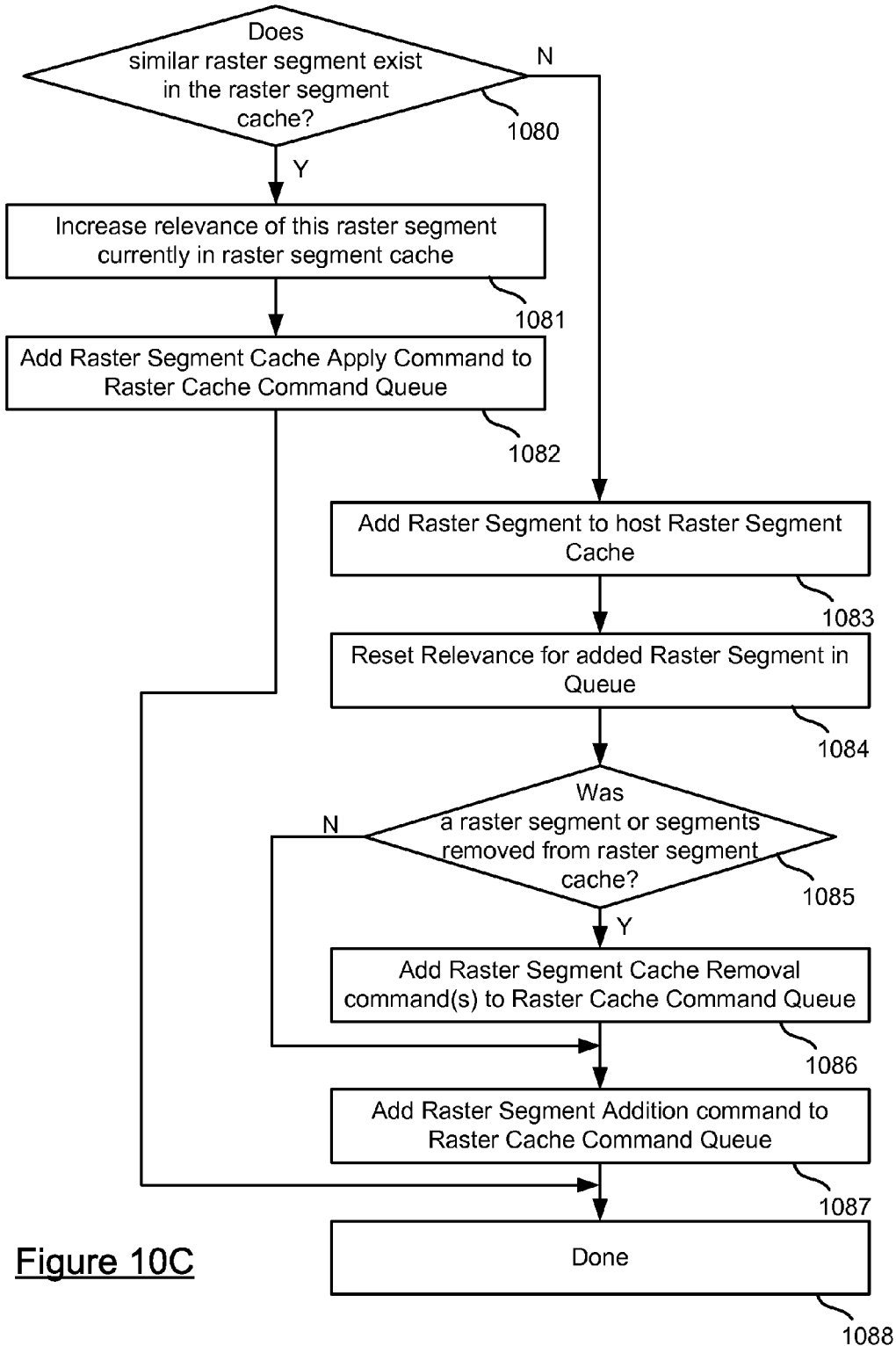
FIG. 10C is a flowchart of an embodiment of a method for adding commands to a raster cache command queue.

FIG. 10C is a flowchart of an embodiment of a method for adding commands to a raster cache command queue. In some embodiments, the method of FIG. 10C provides more detail for step 1074 of the method of FIG. 10B. First, a determination is made as to whether a raster segment exists in the raster segment cache that is similar to the current raster segment at step 1080. A qualifying cached raster segment may be one that exactly matches the current raster segment (for lossless frame rendering) or, in some embodiments, a raster segment that matches the current raster segment within some threshold (for lossy frame rendering)

If a similar raster segment exists in the raster segment cache, a relevance value for the similar raster segment is increased at step 1081. The relevance value is increased to reflect the use of the raster segment in the raster segment cache. A raster segment cache command is added to the raster cache command queue at step 1082. The raster segment cache command identifies the similar raster segment and specifies a coordinate or other location in the new frame that the similar raster segment should be. After adding the raster segment cache command to the queue, the method of FIG. 10C ends at step 1088.

If a similar raster segment does not exist in the raster segment cache at step 1080, then the current segment will be added to a raster segment cache at the host and the client. First, the current raster segment is added to a raster segment cache at the host (server) at step 1083. The raster segment cache at the host is maintained to mirror the raster segment cache at the client. A relevance value of the current segment added to the raster segment cache on the host is reset to an initial value at step 1084. A determination is then made as to whether a raster segment was removed from the raster segment cache at the host at step 1085. One or more raster segments may be removed from the raster segment cache if the raster segment cache did not have enough room for the added raster segment, thereby requiring that the raster segments with the lowest relevance be removed. If a raster segment or segments were removed from the raster segment cache on the server, raster segment cache removal commands are added to the raster cache command queue at step 1086. In some embodiments the removal commands are added to the head of the queue to ensure they are executed prior to any other raster segment cache commands on the client. The removal commands will remove cached raster segments associated with the lowest relevance from the raster command cache at the client when executed. The method then continues to step 1087.

If raster segments are not removed from the raster segment cache at step 1085, the method continues to step 1087 where a raster segment addition command is added to the raster cache command queue at step 1087. This raster segment addition command will add the current raster segment to the raster segment cache at the client. The method of FIG. 10C is then done at step 1088.

Figure 10D:
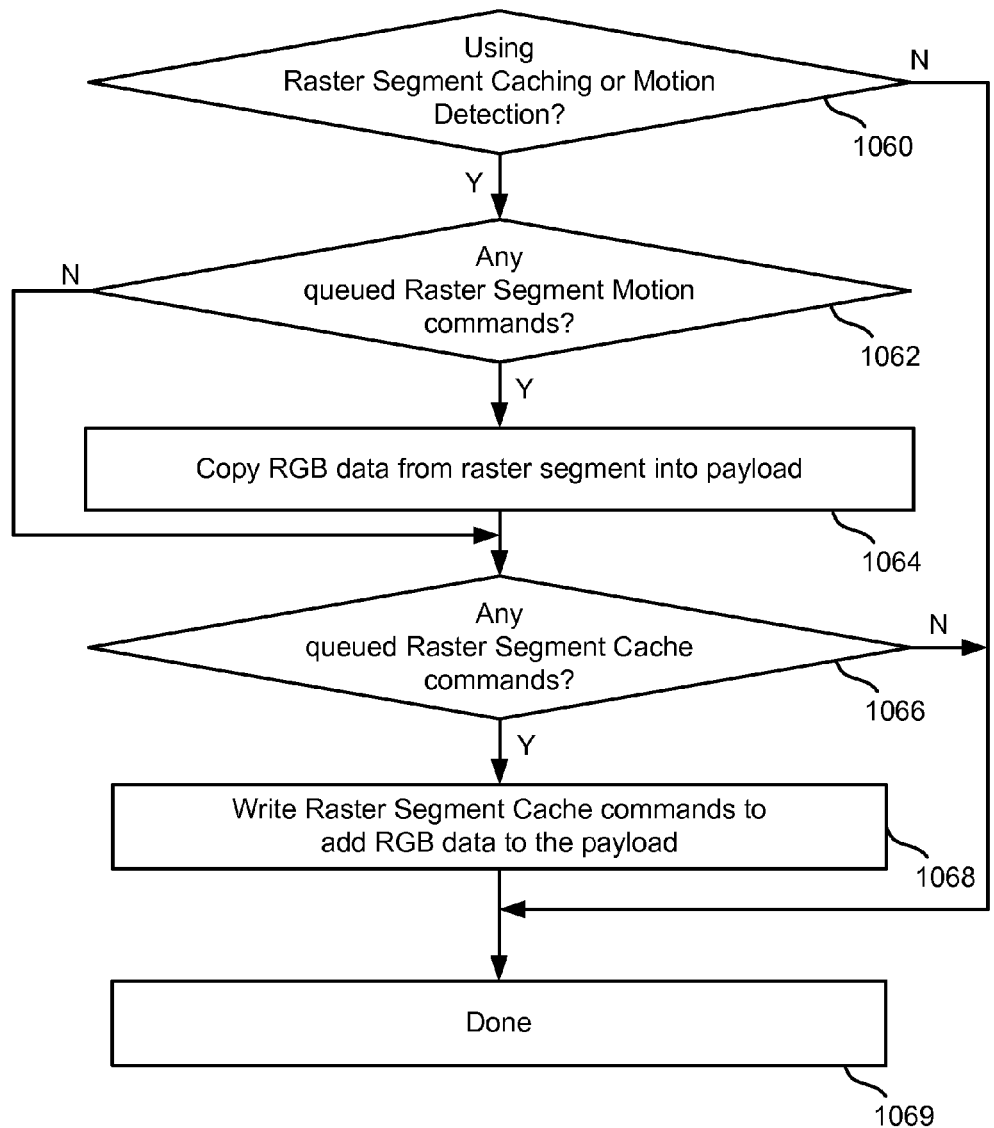
FIG. 10D is a flowchart of an embodiment of a method for executing cached commands to write RGB data into a payload.

FIG. 10D is a flowchart of an embodiment of a method for executing cached commands to write RGB data into a payload. In some embodiments, the method of FIG. 10D provides more detail for step 957 of the method of FIG. 9. First, a determination is made as to whether raster segment caching or motion detection is used by the system of FIG. 1A at step 1060. If neither raster segment caching nor motion detection is used, then the process of FIG. 10D is done at step 1069. If either is used, a determination is made as to whether any raster segment motion commands are queued at step 1062. Raster segment motion commands may be queued if a raster segment determined to have moved between the new image and current image was included in the previous payload sent to the client. Adding raster segment motion commands to a queue is discussed in more detail below with respect to the method of FIG. 10D. If any raster segment motion commands are queued, the queued raster segment motion commands are executed to move RGB data in a raster segment of a previous payload into the current payload at step 1064 and the method continues to step 1066. If no raster segment motion commands are queued, the method continues to step 1066.

A determination is made as to whether any queued raster segment cache commands are queued at step 1066. Raster segment cache commands may be queued if a raster segment determined to have moved between the new image and current image is currently cached at the client. Adding raster segment cache commands to a queue is discussed in more detail below with respect to the method of FIG. 10C. If any raster segment cache commands are queued, the queued raster segment cache commands are executed to add RGB data to the current payload at step 1064. Adding the RGB data may include adding a raster segment to add to the client raster segment cache, adding a command to remove a raster segment from the client cache, adding a command to select a cached raster segment to copy into the current frame, and/or some other command. After copying RGB data is added to the current payload, the method continues to step 1066. If no raster segment motion commands are queued at step 1964, the method continues to step 1066.

As discussed above, the present technology may be implemented with one queue or multiple queues. Though FIG. 10D describes an embodiment that uses one queue, embodiments that place both raster segment motion commands and raster segment cache commands in a single queue may also be implemented.

Figure 10E:
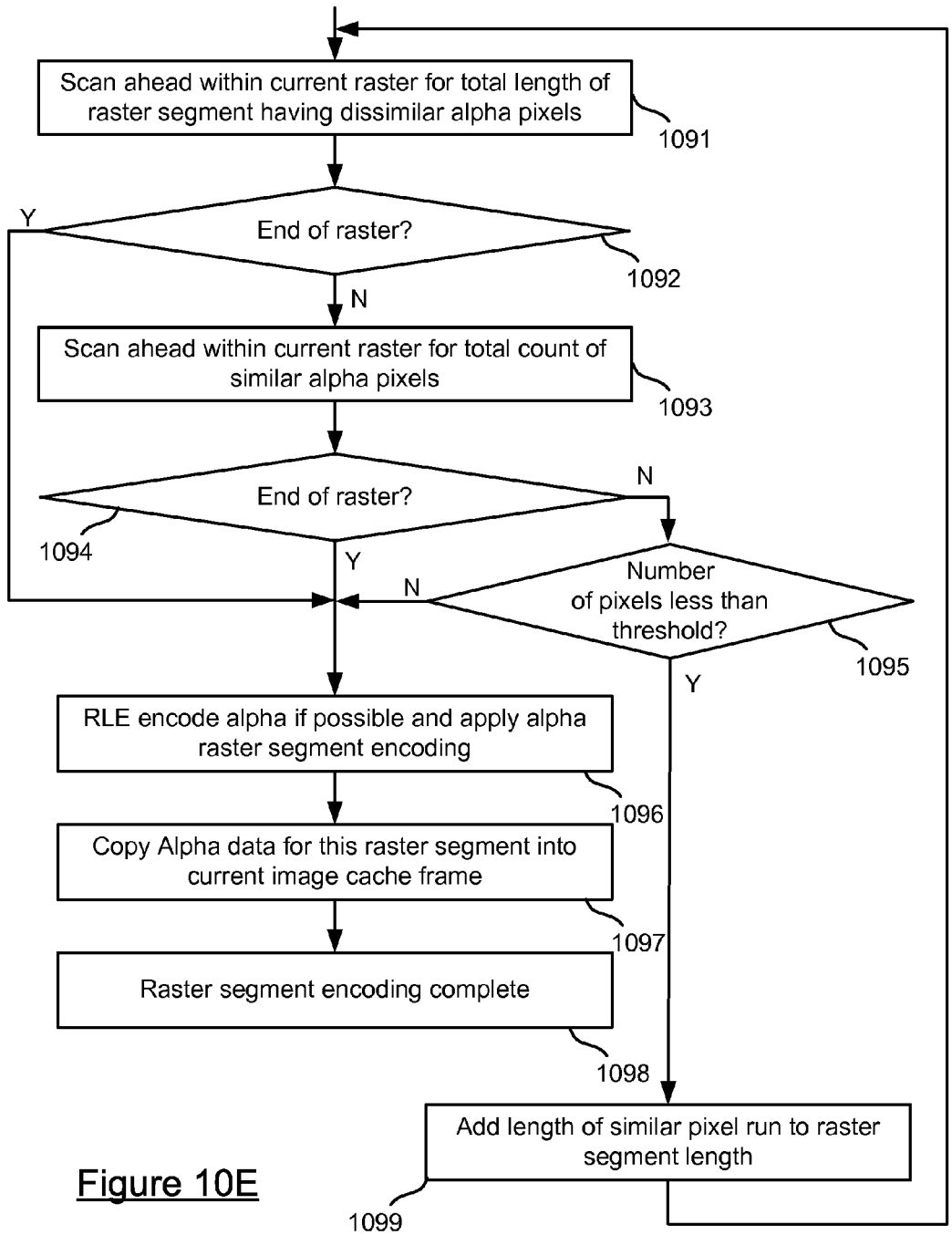
FIG. 10E is a flowchart of an embodiment of a method for encoding raster segments for alpha data.

FIG. 10E follows the same basic structure of encoding alpha as used to encode RGB. The primary difference is that only the alpha values are compared and color data is ignored during this encoding. In particular, in step 1096, alpha data is RLE encoded and alpha raster segment encoding is then applied. The logic for this step is similar to the logic described above with respect o FIGS. 10B-C for RGB payload raster segment encoding. Also of note is the alpha encoder may run length encode (RLE) the contents of the alpha raster segments to reduce the size of the alpha delta encoded payload as seen in step 1096.

Other data formats and color formats may be encoded in a similar manner as RGB data. In particular, segments of different data may be detected in a selected raster for any data format. The resulting segments may comprise the data that differs and in some embodiments a limited run of pixels in the raster (and adjacent to the changed pixels in the raster) that are the same. The raster segments may then be applied to the payload and a copy of a current frame maintained on the server.

Some types of data may be encoded in other ways as well. The color data stored in the raster segment payloads can be compressed using other compression techniques or algorithms. For example, alpha data may be run length encoded (RLE) within the raster segment. RLE includes specifying a raster number, X location, length of pixels and a single alpha value. The alpha values for that run length will all be set to the particular alpha value. Alpha values often have the same data value or very little fluctuation over an entire raster. Thus, RLE can be more efficient that encoding a length of alpha values that have the same or similar values.

FIG. 1A is an example of a format of a payload sent to client 130 by a server 110. Payload 1100 includes a header 1110, motion payload 1120, cache payload 1130, RGB payload 1140, alpha payload 1150, and end of frame payload 1160. Header 1110 includes general information about the entire payload. For example, the header may include payload size, version and check sum information. The header may also indicate a number of payloads sent and/or where the present payload exists within those payloads. For example, a header may indicate that the current payload is a second of seven payloads sent or that it is the last payload of seven sent payloads. Header 1110 may contain continuity information to allow the decoder to detect lost payloads. Header 1110 may also include flags indicating whether data for the motion, cache, RGB and alpha portions of that payload are included. In some embodiments, a flag is set for each payload portion which contains data in the present payload. For example, if a payload header contained a motion payload flag and RGB payload flag set to true and cache payload flag and alpha payload flag set to false, then the motion and RGB portions of the payload would be expected to contain data and the cache and alpha payload portions would not be expected to contain data or to even be present in the payload Motion payload 1120 may include motion vector data. In particular, motion payload 1120 may indicate the number of commands contained in the motion payload and data for each motion command. Each motion command may indicate a rectangle (or some other shape) and a vector or measure of movement. The rectangles may indicate a location and shape of a rectangle, such as a coordinate point, width and height. The vector may indicate a direction of movement for that particular rectangle, a number of pixels the object has moved, a new location for the origin pixel, or some other indication of motion. For example, the motion vector may include data of "−10" pixels, "20 pixels down" or some other expression for indicating a distance and direction, a new origin coordinate of (20, 15), or some other data.

Cache payload 1130 may include commands for setting a particular frame cached at the client as a current frame. In some embodiments, a cache payload is exclusive of a motion payload; if a motion payload is included in a payload, a cache payload is not. Examples of cache commands included in a cache payload include commands to set cache ID number at a client and commands to set to a cache ID number and fill a particular value at a client. A command is set to a cache ID number and fill a particular background may be useful when a background has a relatively uniform color.

RGB payload 1140 provides data regarding pixel red-green-blue data. In particular, an RGB payload may indicate the number of rasters for which data is provided in the payload, the number of raster segments within each raster, a Y location (raster location) and number of segments within the Y location, an X location and length of each segment and a pixel data in RGB format for each pixel of a segment. The pixel data may indicate new pixel data to apply to the current frame or cached frame.

Alpha payload 1150 contains data in a format similar to the RGB payload format with the number of rasters in the payload, the raster number, the number of raster segments for the raster, an X location and length for each segment, and alpha pixel data for each pixel in each segment. The alpha payload may also optionally include an indication, for example a flag, as to whether the alpha payload is run length encoded.

End of Frame payload 1160 may indicate the payload is the last payload needed to fully realize a frame update. When an End_of_frame flag is set, the payload may provide data regarding a shape or bounding rectangle to indicate to UI decoder 131 the area of the frame which has changed and needs updating on the display device.

FIG. 11B is another example of a format of a payload sent to client 130 by a server 110. The payload of FIG. 11B includes an RGB raster segment command portion and an alpha Raster segment command portion.

The RGB raster segment command portion includes the number of RGB raster commands and raster segment command and command data. The raster segment command and command data may include data for a raster segment motion command, raster segment cache apply command, raster segment cache addition command and raster segment cache removal command. The raster segment motion command may include data of a current X,Y location and data length for a particular raster to move and the X,Y location in the new frame at which to move the raster segment. The raster segment cache apply command may include a cache ID for the cached raster segment to apply and an X,Y location in the new frame at which to apply raster segment. The raster segment cache addition command may include a cache ID, the length of the RGB sample and the RGB data for the segment. A raster segment cache removal command includes the cache ID of the raster segment to remove.

The alpha Raster segment command portion is similar to the RGB raster segment command portion format except that it contains data for alpha graphical data. For example, the raster segment cache addition command includes the cache ID of the alpha raster segment, the length of the alpha sample length and the alpha data for the raster segment to add. Though command data in payload 11B is listed in a type of format (for example, X,Y coordinates for location data), other formats of data may be used and are considered within the scope of the present technology.

Client Receipt and Processing of Payload

Thin client 130 may receive the payload transmitted by server 110. Once received, the payload may be passed to UI decoder 131 and parsed to retrieve encoded commands, frame data and other graphical update data. The commands are then executed in a particular order to render a new frame at the client. The new frame is rendered by updating a current frame or cached frame at the client with graphical updates contained in the payload (cache, motion and delta commands). The rendered frame is then presented through a display device at client 130.

Figure 12:
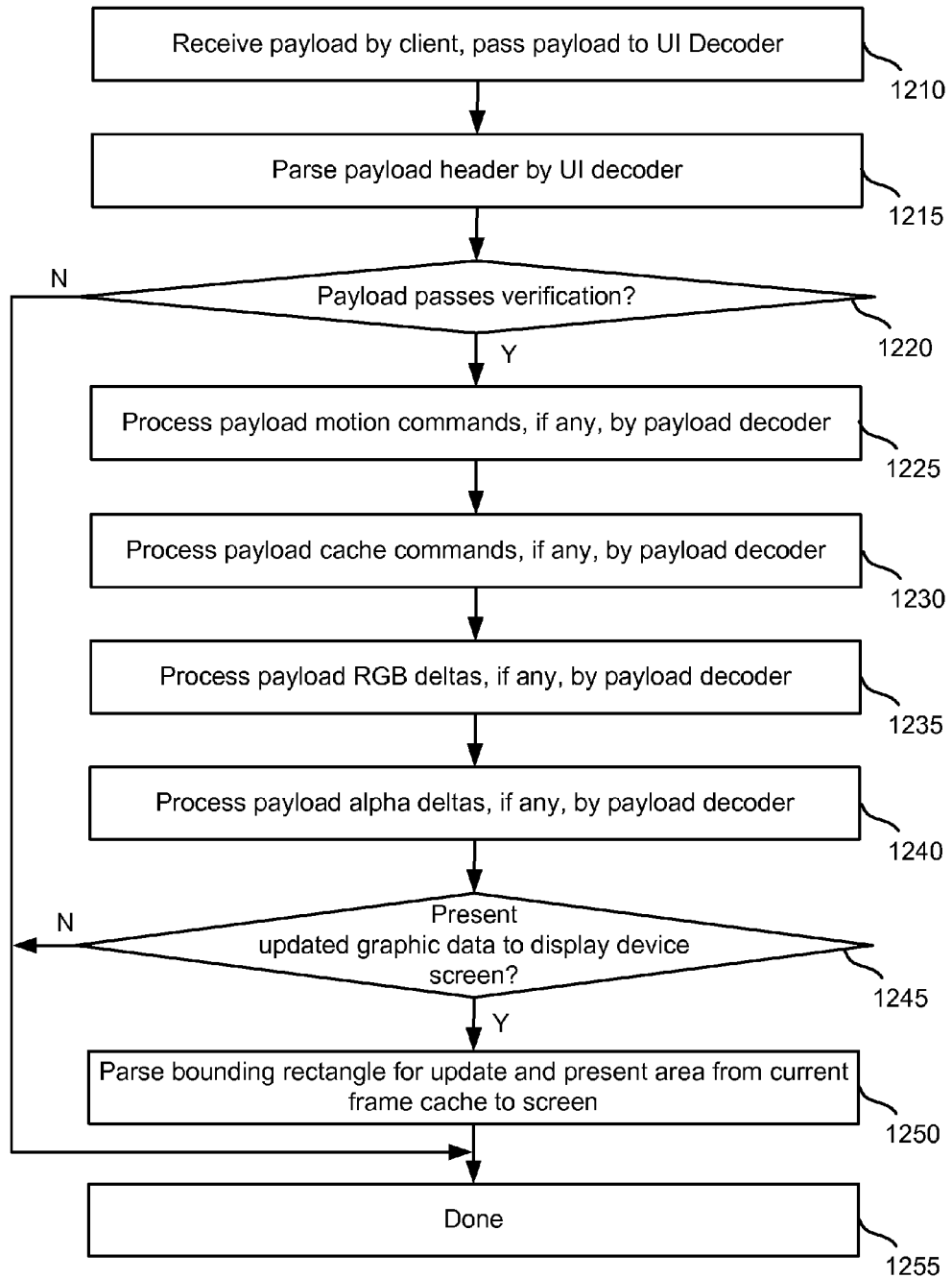
FIG. 12A is a flowchart of an embodiment of a method for performing decoder logic on a client.
FIG. 12B is a flowchart of an embodiment of a method for processing raster segment commands at a client.

FIG. 12A is a flowchart of an embodiment of a method for performing decoder logic on a client. A payload is received by client 130 and passed to UI decoder 132 on the client at step 1210. The payload header is then parsed by UI decoder 131 at step 1215. As illustrated in FIG. 11, payload header 1110 of a payload 1100 may include size, version, checksum, sub-payload portion flags, and indication of whether the current payload is the last of several payloads, and optionally other data. After parsing the payload header, a determination is made as to whether the payload passes verification at step 1220. Payload verification may include determining whether the actual payload size matches an indicated payload size and confirming checksum data. Verifying a payload is discussed in more detail below with respect to FIG. 13. If a payload fails verification, then the client encoding process does not process the payload any further and does not provide updated graphical data in the form of a new frame. Rather, the method ends at step 1255.

If a payload passes verification, any payload motion commands contained in motion payload 1120 are processed at step 1225. The motion commands may include a list of rectangle data (or other shape data) and a vector indicating where to move each rectangle. In some embodiments a payload may not contain any motion commands, such as if a payload contains cache payload 1130. Processing payload motion commands by payload decoder 132 is discussed in more detail below with respect to the method of FIG. 14.

Any payload cache commands contained in cache payload 1130 are processed at step 1230. Cache commands may include providing a cache ID for the payload decoder to select and optionally provide any fill data in the cached frame. Cache commands will not be included in a payload that includes motion commands, and vice versa. Processing payload cache commands by payload decoder 132 is discussed in more detail below with respect to the method of FIG. 17A-17C.

Payload RGB delta encode commands contained in RGB payload 1140 are processed at step 1235. RGB delta encode commands may include a raster and X location to encode in a frame and color value data to copy to the frame. The encode RGB delta commands will be applied to a current frame. Processing payload RGB delta encode commands by payload decoder 132 is discussed in more detail below with respect to the method of FIG. 18.

Alpha payload commands in alpha payload 1150, if any, are processed at step 1240. Alpha delta encode commands may include a raster, X location and alpha value data to copy to the frame. In some embodiments, RLE alpha values may be decoded from alpha payload 1150. Similar to RGB encode commands, alpha encode commands will be applied to the current frame. Processing payload alpha commands by payload decoder 132 is discussed in more detail below with respect to the method of FIG. 19.

After processing a payload, a determination is made as to whether or not to present the updated graphic to display device screen at step 1245. In one embodiment, an update from a current frame to a new frame may be specified over several payloads. The last payload of the several payloads may indicate that it is the latest payload. For example, header 1110 of payload 1100 may include a flag or other data indicating that is a "last payload." In this embodiment, the UI decoder will determine to present the updated graphic to a display device screen if the most recently received payload included a flag which was set to indicate that the payload was the last payload. If the updated graphic data is not to be presented, the method of FIG. 12A is complete. If the updated graphic data is to be presented, a bounding shape or rectangle containing graphical updates is parsed and the area from the current cache frame is presented to the display device at step 1250. The method then ends at step 1255.

Figure 12B:
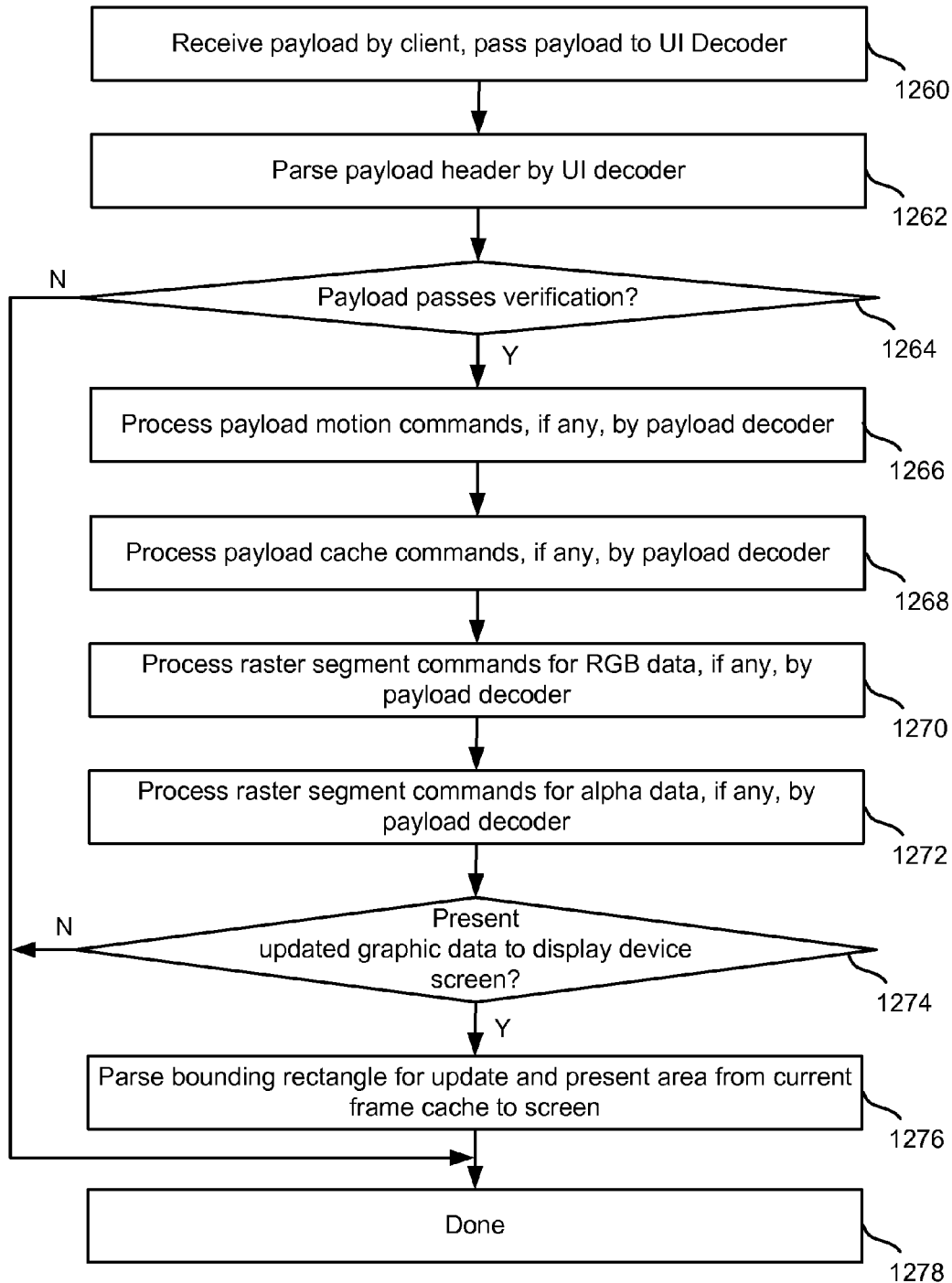

FIG. 12B is similar to FIG. 12A, except that steps 1235 and 1240 of FIG. 12A are replaced by steps 1270 and 1272 in FIG. 12B which process raster segment commands. In particular, raster segment commands are processed for RGB data, if any, by the payload decoder at step 1270. Processing RGB data commands is discussed in more detail below with respect to FIG. 17B. Raster segment commands are processed for alpha data, if any, by the payload decoder at step 1272. This is similar to the process of FIG. 17B, but is performed for alpha data.

Figure 13:
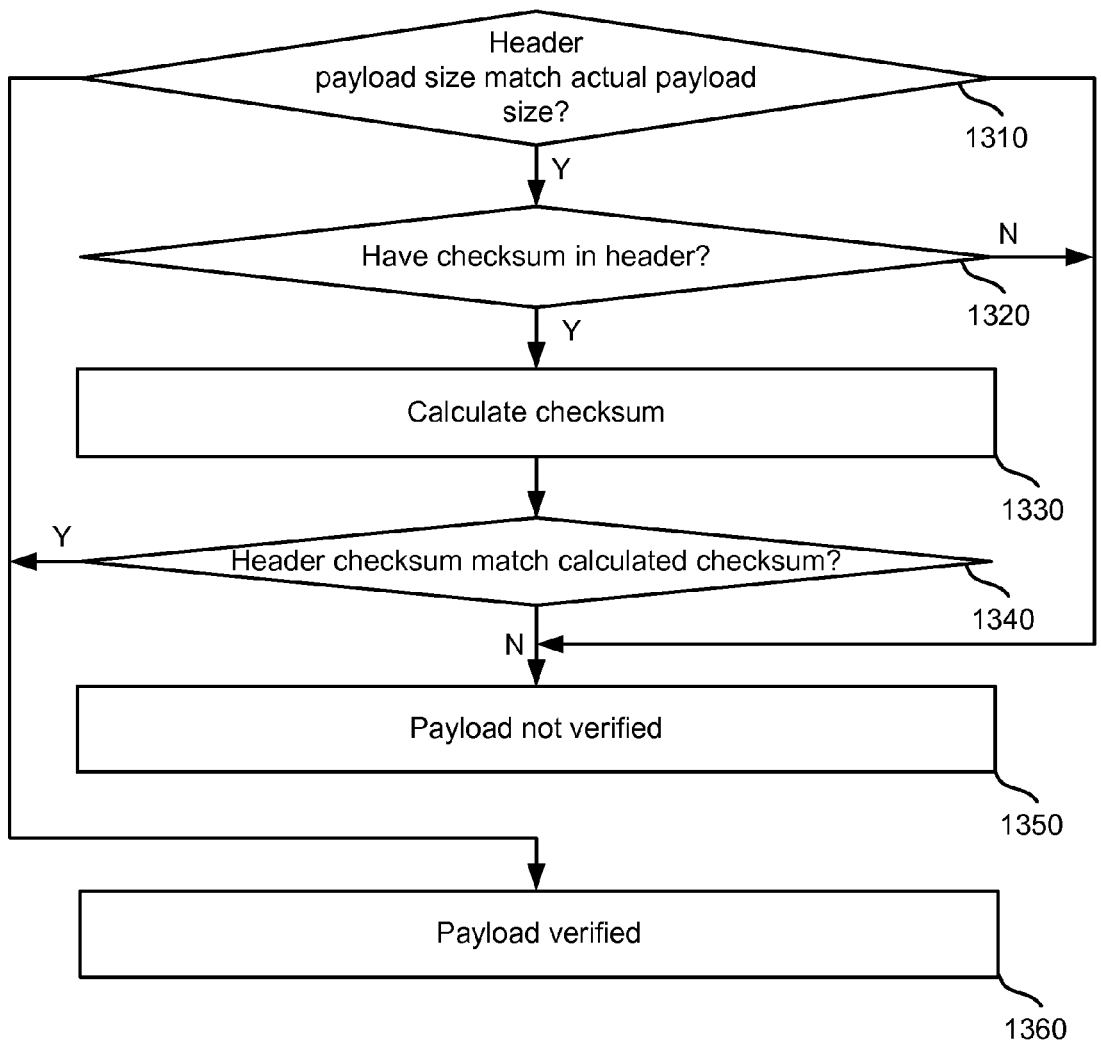
FIG. 13 is a flowchart of an embodiment of a method for verifying a payload.

FIG. 13 is a flowchart of an embodiment of a method for verifying a payload. In some embodiments, the method of FIG. 13 provides more detail for step 1220 of the method of FIG. 12A. First, a determination is made as to whether the actual payload size matches a payload size indicated in header 1110 of the payload. If the actual size and indicated size of the payload do not match, the payload fails verification at step 1360. If the actual size and indicated size of the payload match, a determination is made as to whether a checksum is contained in the header. If the checksum is not contained in the header, a checksum comparison is not performed and the payload is determined to pass the verification at step 1350. In some embodiments, a payload may be considered to fail verification if the payload does not contain a checksum. In other embodiments, the checksum may only be used as a testing mechanism If the checksum is contained in the header (or elsewhere in the payload), the checksum of the payload is calculated at step 1330. A determination is then made as to whether the calculated checksum matches the indicated checksum at step 1340. If the checksums match, the payload passes verification at step 1350. If the checksums do not match, the payload fails verification at step 1360.

Figure 14:
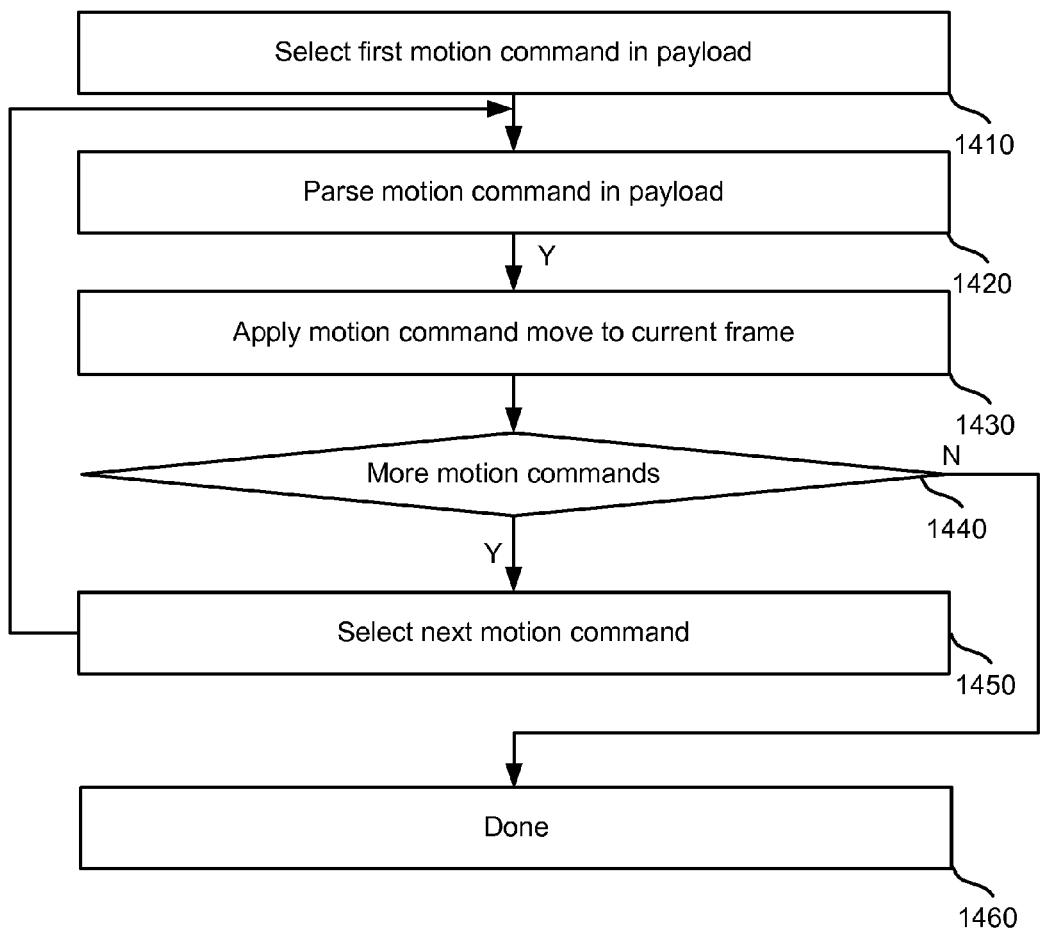
FIG. 14 is a flowchart of an embodiment of a method for processing payload motion commands.

FIG. 14 is a flowchart of an embodiment of a method for processing payload motion commands. In some embodiments, the method of FIG. 14 provides more detail for step 1225 of the method of FIG. 12A. First, a first motion command is selected in the payload by payload decoder 132 at step 1420. The motion commands are selected from motion payload 1120. The selected motion command is then parsed at step 1420. The parsing determines the rectangle and vector which comprise the motion command. The parsed motion command is then applied to the current frame at step 1430.

Applying the motion command results in copying a rectangle (or other shape) from a first position in a current frame and applying the copy to a second position in a current frame, such as the resulting frame illustrated in the center frame of FIG. 8C. After applying the selected motion command, a determination is made as to whether more motion commands exist in the motion payload at step 1430. If no additional motion commands exist in a payload, processing of payload motion commands is complete at step 1450. If additional motion commands exist in the payload, the next motion command is selected at step 1450 and the method returns to step 1420 to parse the selected motion command.

As discussed above, the present technology may accelerate remote user interface rendering through caching. Caching at the client may be implemented in an efficient manner by configuring use of a frame buffer as a virtual cache and using pointers to indicate which cached frame is a current frame. FIGS. 15A and 15B are examples of managing a frame cache with a frame buffer. As illustrated in FIG. 15A, a frame buffer contains a frame of "A" while a frame cache contains three frames of A, B and C. As a graphical update to the current frame is required, for example an update from frame of A to frame of B as illustrated in FIG. 15B, data comprising the B frame is copied into the frame buffer from the frame cache. Copying a frame from a cache into a frame buffer uses precious CPU processing resources and inefficiently requires some duplication of stored data at the client.

In some embodiments of the present technology, frames may be cached using a virtual frame cache. FIGS. 16A and 16B are examples of configuring a frame buffer as a virtual frame cache. A frame pointer may be used to indicate which portion of a frame cache or virtual frame cache (formerly a frame buffer) contains the current frame to be displayed in the user interface. In FIG. 16A, the current frame pointer is set to the address of frame of A within the virtual frame cache. In FIG. 16B, the current frame pointer is set to the address of frame D within the frame cache. Utilizing a frame buffer as a virtual frame cache and a current frame pointer to identify the location of a cached current frame allows for quicker access to a larger size frame cache. This "zero copy cache" method also effectively provides one additional cache frame over the previous method using the same amount of memory storage, since there is no duplication of the current cache frame.

Figure 17A:
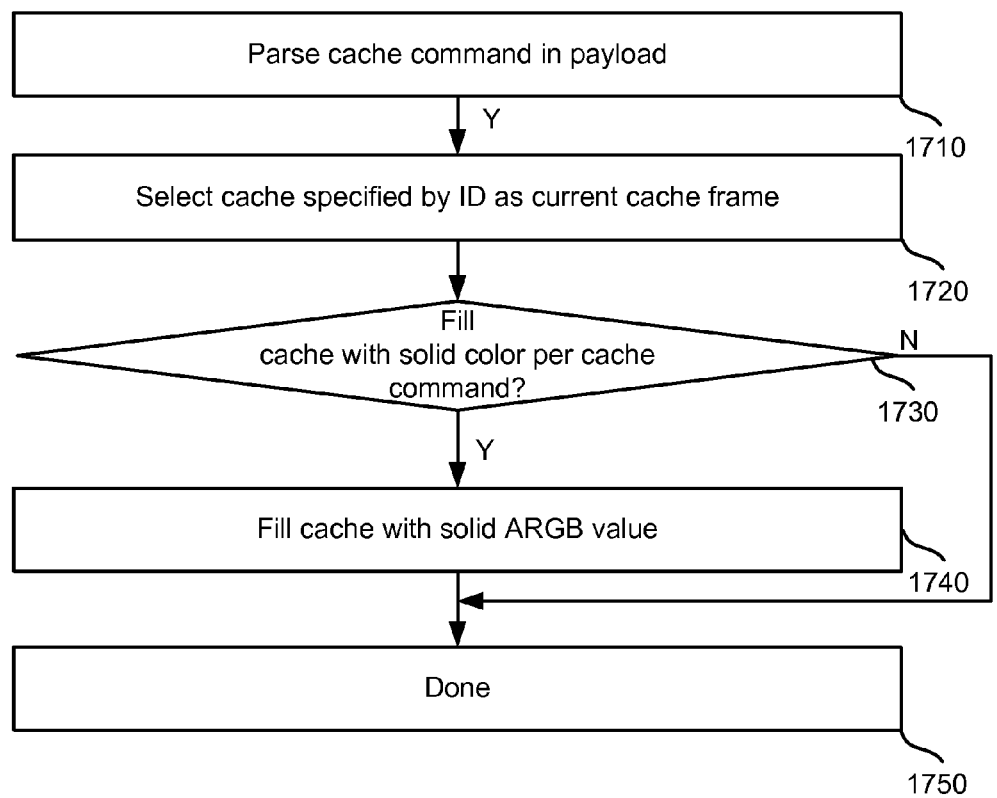
FIG. 17A is a flowchart of an embodiment of a method for processing payload cache commands.

FIG. 17A is a flowchart of an embodiment of a method for processing payload cache commands. In some embodiments, the method of FIG. 17A provides more detail for step 1230 of the method of FIG. 12A. First, a cache command is parsed in a cache payload portion of payload 1100 at step 1710. A cache ID is then selected as the current cache frame at step 1720. The selected cache ID corresponds to a cache ID contained in the parsed cache command. A determination is then made as to whether to fill the current cached frame with solid color as instructed by the cache command at step 1730. As discussed above, delta encoder 119 may encode a cache command with fill data if the cache logic detects a constant color fill when processing the cache frame. If the cache command includes color fill data, the current cache frame is filled as indicated by the corresponding fill data at step 1740 and the method is complete at step 1750. If the cache command does not include color fill data, the current cache frame is not filled and the method is complete at step 1750.

Figure 17B:
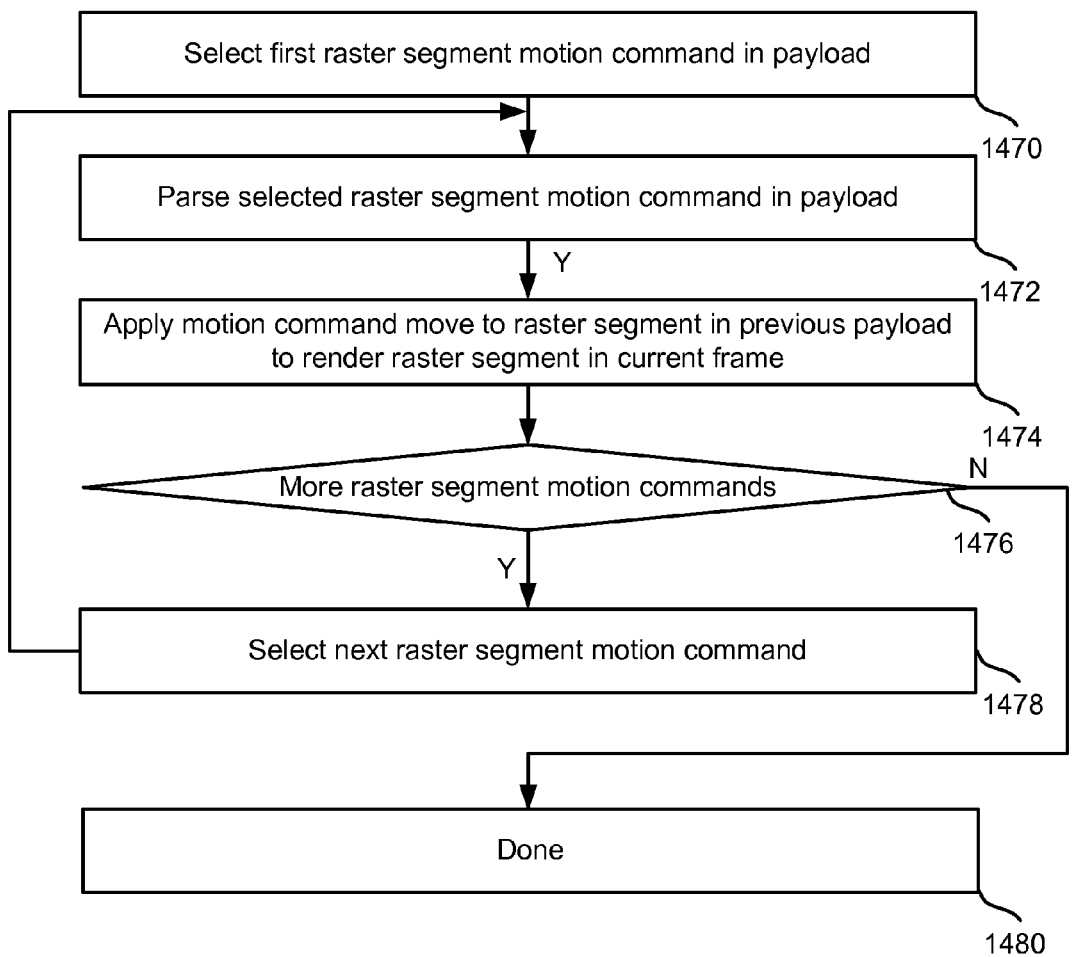
FIG. 17B is a flowchart of an embodiment of a method for processing payload raster segment motion commands.

FIG. 17B is a flowchart of an embodiment of a method for processing payload raster segment motion commands. In some embodiments, the method of FIG. 17B provides more detail for step 1235 of the method of FIG. 12B. A first raster segment motion command in a payload is selected at step 1470. The selected raster segment motion command is then parsed at step 1472

After parsing the command, the raster segment motion command is applied to a raster segment in the previous payload to render the raster segment in the current frame at step 1474. Applying the raster segment motion command may include selecting a raster segment identified by the raster segment motion command and placing the selected raster segment in the current frame at a location specified in the raster segment motion command. After applying the raster segment motion command, a determination is made as to whether more raster segment motion commands exist in the payload to be processed at step 1476. If no further raster segment motion commands exist to be processed, the method is complete at step 1480. If further raster segment motion commands exist to be processed, the next raster segment motion command is selected at step 1478 and the method returns to step 1472.

Figure 17C:
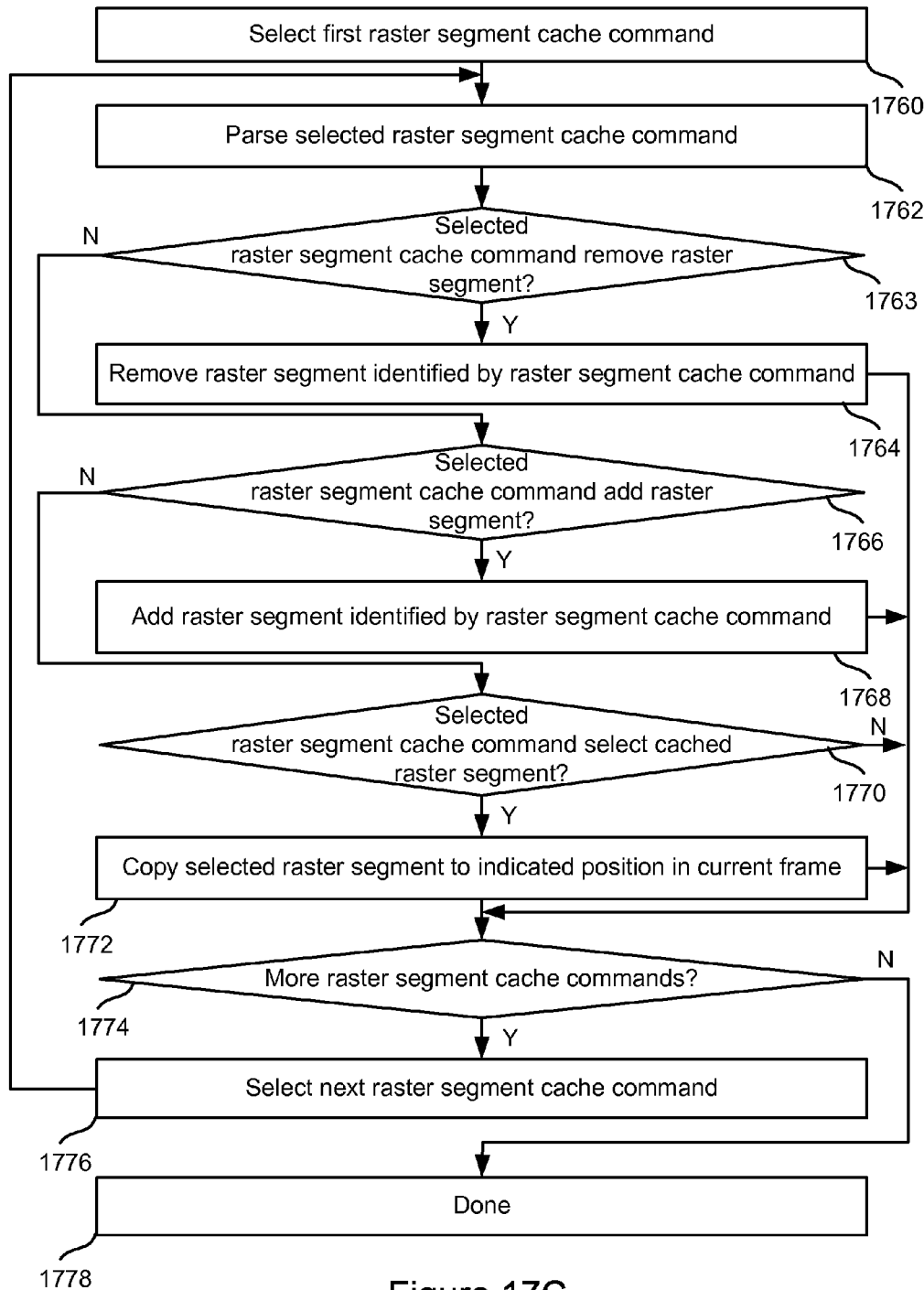
FIG. 17C is a flowchart of an embodiment of a method for processing payload raster segment cache commands.

FIG. 17C is a flowchart of an embodiment of a method for processing payload raster segment cache commands. In some embodiments, the method of FIG. 17C provides more detail for step 1235 of the method of FIG. 12B. A first raster segment cache command is selected from a payload at step 1760. The selected raster segment cache command is then parsed at step 1762. Then, a determination is made as to whether the selected raster segment cache command results in removing a raster segment from the raster segment cache at step 1763. A raster segment cache command may results in removing a raster segment from the raster segment cache if the command is associated with an addition to the cache and the cache does not have room for another raster segment; thus, a raster segment has to be removed from the cache to make room for another raster segment to be added. If the selected raster segment cache command results in removing a raster segment from the raster segment cache, a raster segment is removed at step 1764 and the method continues to step 1774. The removed raster segment may be identified in the raster segment cache command.

If the selected raster segment cache command does not result in removing a raster segment from the raster segment cache, a determination is made as to whether the selected raster segment cache command adds a raster segment at step 1766. A selected raster segment may be added to the raster segment cache if it is not already contained in the cache. If the selected raster segment cache command adds a raster segment, the raster segment is added to the raster segment cache at step 1768. After adding the raster segment into the client cache, the method of FIG. 17C continues to step 1774.

If the selected raster segment cache command does not add a raster segment to the raster segment cache, a determination is made as to whether the raster segment cache command selects a cached raster segment at step 1770. If the command instructs the UI decoder to select a cached raster segment and place the segment in the current frame, the raster segment cache command identifies the cached raster segment as well as the location in the current frame to copy the raster segment to at step 1772 and the method continues to step 1774. If the selected raster segment cache command does not select a cached raster segment, the method continues to step 1774.

A determination is made as to whether more raster segment cache commands exist to be processed at step 1774. If more raster segment cache commands exist in the payload to be processed, the next raster segment cache command is selected to be processed at step 1776 and the method returns to step 1762 where the selected raster segment cache command is parsed. If no additional raster segment cache commands exist in the payload to be processed, the method ends at step 1778.

Figure 18:
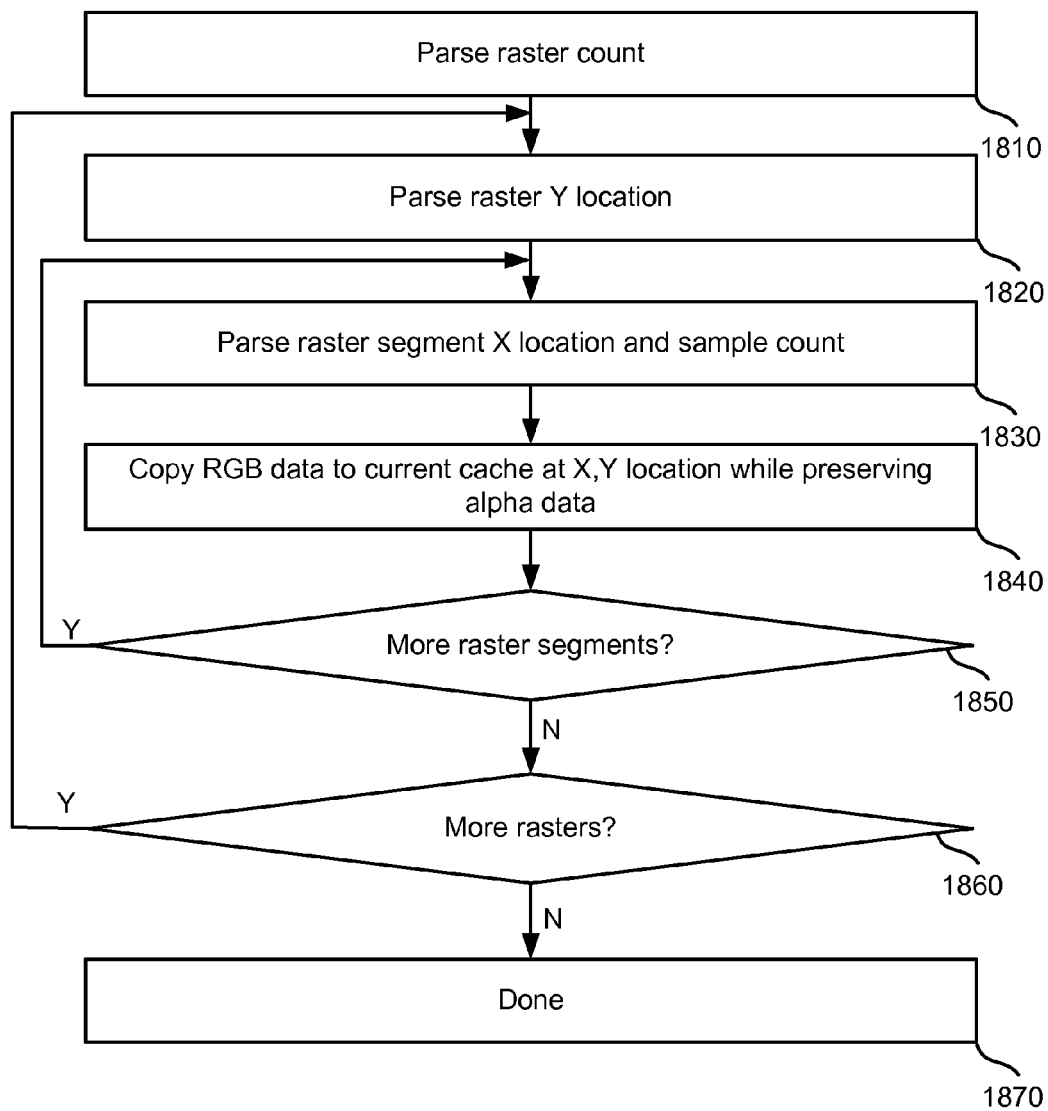
FIG. 18 is a flowchart of an embodiment of a method for processing payload RGB delta commands.

FIG. 18 is a flowchart of an embodiment of a method for processing payload RGB delta commands. In some embodiments, the method of FIG. 18 provides more detail for step 1235 of the method of FIG. 12A. A raster count is first parsed at step 1810 and raster Y location is parsed at step 1820. The raster segment X location and sample count is then parsed at step 1830 and the RGB data encoded in the delta payload is copied to the current cache frame at the indicated X,Y position at step 1840. The alpha data for the updated pixels is preserved (unchanged) while the RGB data is copied into the current cache frame. After copying the RGB data, a determination is made as to whether any more raster segments exist to be parsed at step 1850. If more raster segments exist to be parsed, the method returns to step 1850 where the next raster segment is selected and parsed. If no more raster segments exist to be parsed in the current raster, a determination is made as to whether any more rasters exist to be parsed at step 1860. If no more rasters exist to be parsed, processing of RGB delta commands in the payload is complete at step 1870. If more rasters exist to be parsed, the method returns to step 1820 wherein the next raster is selected and the raster data is parsed.

Figure 19:
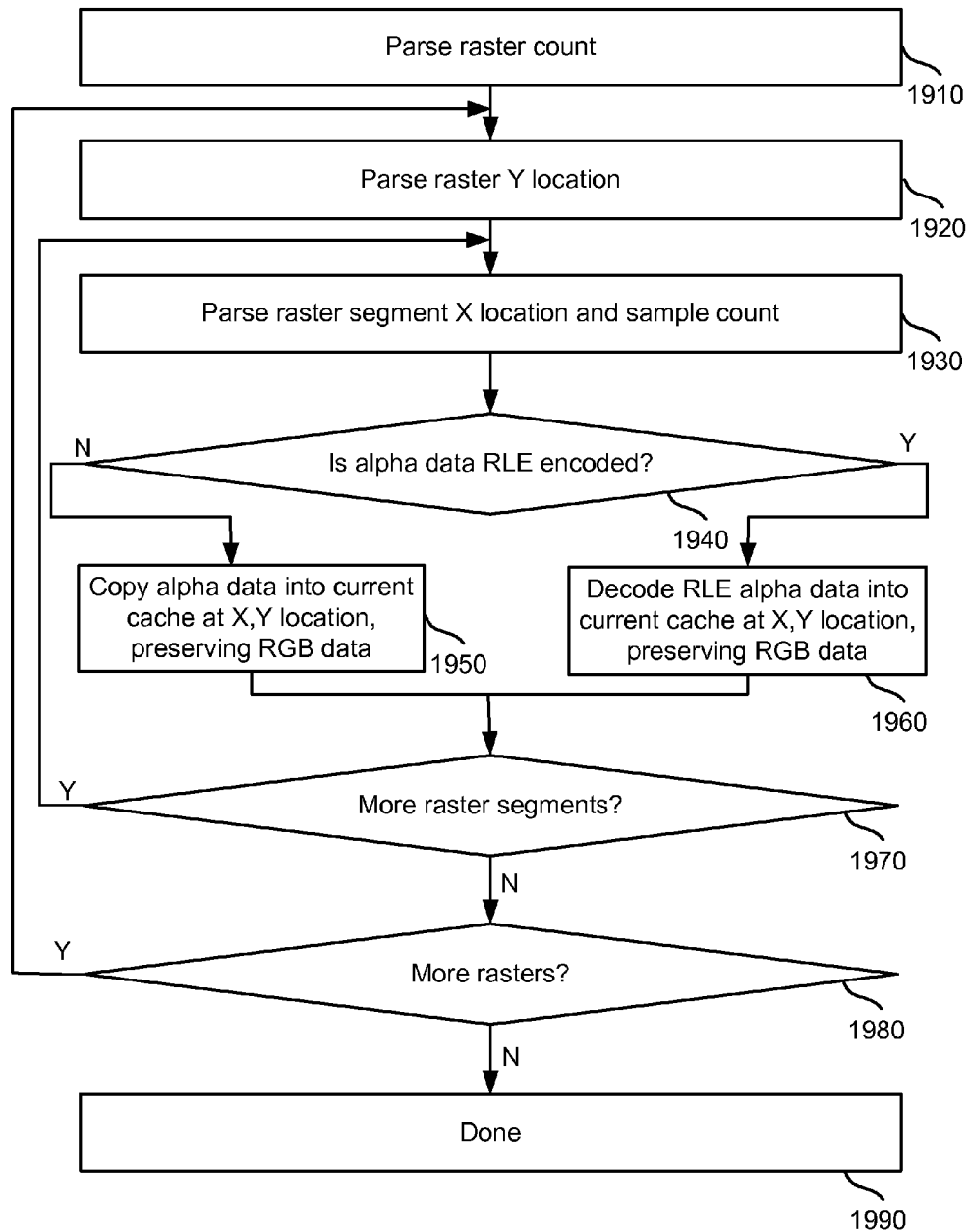
FIG. 19 is a flowchart of an embodiment of a method for processing payload alpha delta commands.

FIG. 19 is a flowchart of an embodiment of a method for processing payload alpha delta commands. In some embodiments, the method of FIG. 19 provides more detail for step 1240 of the method of FIG. 12A. A raster count is first parsed at step 1910, the raster Y location is then parsed at step 1920, and a raster segment X location and sample count is parsed at step 1930. A determination is then made as to whether the alpha data is RLE encoded at step 1940. As discussed above, the alpha payload may have a flag or some other indication that the alpha data may be run length encoded rather than segment encoded to more efficiently encode alpha data having the same or similar values. If the alpha data is run length encoded, the RLE alpha data is decoded into the current cache at the determined X,Y location for the length indicated. While decoding the RLE alpha data, the RGB data values are preserved (not changed). If the alpha data is not run length encoded, the alpha data is encoded into the current cache in raster segments similar to how RGB data is encoded or copied into the current cache frame. After raster segment alpha data or RLE alpha data is decoded into the cache, a determination is made as to whether more raster segments (or RLE encodings) exist for the raster at step 1970. If more raster segments exist, the next segment is selected and the raster segment is parsed at step 1930. If more raster segments do not exist, a determination is made as to whether more rasters exist to be processed. If more rasters exist, the next raster is selected and the raster is parsed at step 1920. If more rasters do not exist, the method is complete at step 1990.

Figure 20:
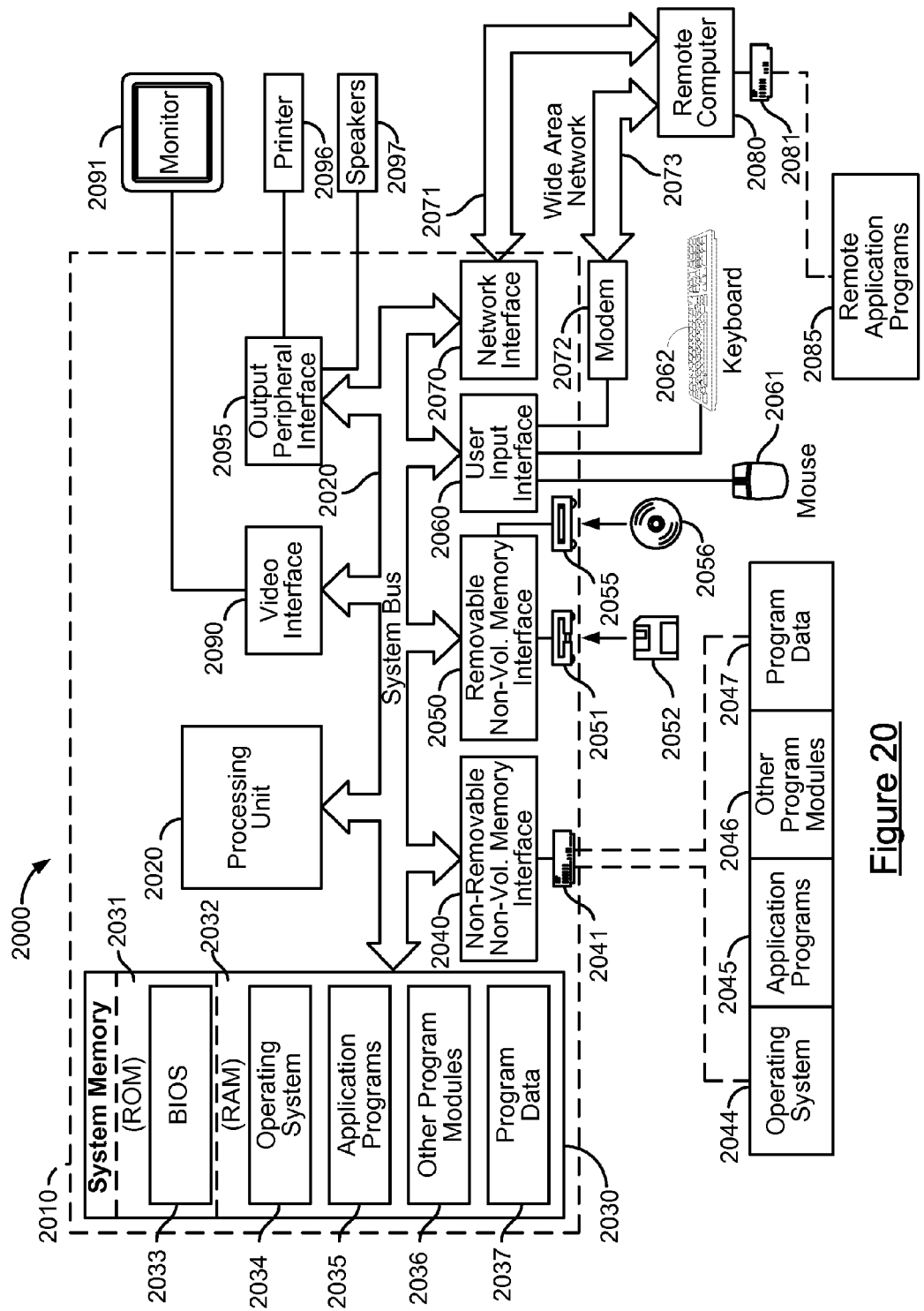
FIG. 20 is a block diagram of an embodiment of a computing environment for implementing the present technology.

FIG. 20 is a block diagram for an embodiment of a computing environment for implementing the present technology. In some embodiments, the computing environment of FIG. 20 may be used to implement server 110 and client 130 of the system of FIG. 1A.

Computing environment 2000 of FIG. 20 is only one example of a suitable computing environment and is not intended to suggest any limitation as to the scope of use or functionality of the technology herein. Neither should the computing environment 2000 be interpreted as having any dependency or requirement relating to any one or combination of components illustrated in the exemplary operating environment 2000.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 20, an exemplary system for implementing the technology herein includes a general purpose computing device in the form of a computer 2010. Components of computer 2010 may include, but are not limited to, a processing unit 2020, a system memory 2030, and a system bus 2021 that couples various system components including the system memory to the processing unit 2020. The system bus 2021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2010 typically includes a variety of computer readable media. Computer readable media can be any available media that can be accessed by computer 2010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2030 includes computer storage media in the form of volatile and/or nonvolatile memory such as read only memory (ROM) 2031 and random access memory (RAM) 2032. A basic input/output system 2033 (BIOS), containing the basic routines that help to transfer information between elements within computer 2010, such as during start-up, is typically stored in ROM 2031. RAM 2032 typically contains data and/or program modules that are immediately accessible to and/or presently being operated on by processing unit 2020. By way of example, and not limitation, FIG. 20 illustrates operating system 2034, application programs 2035, other program modules 2036, and program data 2037.

The computer 2010 may also include other removable/non-removable, volatile/nonvolatile computer storage media. By way of example only, FIG. 20 illustrates a hard disk drive 2040 that reads from or writes to non-removable, nonvolatile magnetic media, a magnetic disk drive 2051 that reads from or writes to a removable, nonvolatile magnetic disk 2052, and an optical disk drive 2055 that reads from or writes to a removable, nonvolatile optical disk 2056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2041 is typically connected to the system bus 2021 through a non-removable memory interface such as interface 2040, and magnetic disk drive 2051 and optical disk drive 2055 are typically connected to the system bus 2021 by a removable memory interface, such as interface 2050.

The drives and their associated computer storage media discussed above and illustrated in FIG. 20, provide storage of computer readable instructions, data structures, program modules and other data for the computer 2010. In FIG. 20, for example, hard disk drive 2041 is illustrated as storing operating system 2044, application programs 2045, other program modules 2046, and program data 2047. Note that these components can either be the same as or different from operating system 2034, application programs 2035, other program modules 2036, and program data 2037. Operating system 2044, application programs 2045, other program modules 2046, and program data 2047 are given different numbers here to illustrate that, at a minimum, they are different copies. A user may enter commands and information into the computer 200 through input devices such as a keyboard 2062 and pointing device 2061, commonly referred to as a mouse, trackball or touch pad. Other input devices (not shown) may include a microphone, joystick, game pad, satellite dish, scanner, or the like. These and other input devices are often connected to the processing unit 2020 through a user input interface 2060 that is coupled to the system bus, but may be connected by other interface and bus structures, such as a parallel port, game port or a universal serial bus (USB). A monitor 2091 or other type of display device is also connected to the system bus 2021 via an interface, such as a video interface 2090. In addition to the monitor, computers may also include other peripheral output devices such as speakers 2097 and printer 2096, which may be connected through an output peripheral interface 2090.

The computer 2010 may operate in a networked environment using logical connections to one or more remote computers, such as a remote computer 2080. The remote computer 2080 may be a personal computer, a server, a router, a network PC, a peer device or other common network node, and typically includes many or all of the elements described above relative to the computer 2010, although only a memory storage device 2081 has been illustrated in FIG. 20. The logical connections depicted in FIG. 20 include a local area network (LAN) 2071 and a wide area network (WAN) 2073, but may also include other networks. Such networking environments are commonplace in offices, enterprise-wide computer networks, intranets and the Internet.

When used in a LAN networking environment, the computer 2010 is connected to the LAN 2071 through a network interface or adapter 2070. When used in a WAN networking environment, the computer 2010 typically includes a modem 2072 or other means for establishing communications over the WAN 2073, such as the Internet. The modem 2072, which may be internal or external, may be connected to the system bus 2021 via the user input interface 2060, or other appropriate mechanism. In a networked environment, program modules depicted relative to the computer 2010, or portions thereof, may be stored in the remote memory storage device. By way of example, and not limitation, FIG. 20 illustrates remote application programs 2085 as residing on memory device 2081. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
   generating a first set of raster segments from differences between a first frame and a second frame for a user interface;
   accessing a second set of raster segments from differences between the second frame and a third frame for the user interface;
   identifying a first raster segment of the first set that matches a second raster segment of the second set; and
   generating a command to move the first raster segment from a first position in the second frame to a second position in the first frame.

2. The method of claim 1, wherein said step of generating a first set of raster segments includes:
   comparing a current frame provided to a user through the user interface at a remote client to a new frame to be provided to the user through the user interface; and
   identifying one or more adjacent pixel positions having different values between the current frame and the new frame, the first frame comprising the new frame and the second frame comprising the current frame.

3. The method of claim 2, wherein said step of identifying includes:
   determining whether the first raster segment and second raster segment are within the same raster.

4. The method of claim 2, wherein said step of identifying includes:
   determining the first raster segment and second raster segment are within different rasters.

5. The method of claim 3, wherein said step of generating a command includes:
   caching a command to move the first raster; and
   encoding the command to a payload.

6. The method of claim 3, wherein said step of comparing includes:
   determining if the first raster segment has data values within a threshold of the second raster segment data values.

7. The method of claim 6, wherein the threshold is applied to the difference between each pair of pixels.

8. The method of claim 6, wherein the threshold is applied to the average pixel difference for each pair of compared segments.

9. The method of claim 8, wherein said first raster and second raster contain RGB data values.

10. The method of claim 1, wherein generating a command includes:
    caching a raster segment cache command to move a cached raster segment; and
    encoding the raster segment cache command to a payload.

11. The method of claim 10, wherein generating a command includes:
    increasing a relevance value for the cached raster segment.

12. The method of claim 1, wherein generating a command includes:
    determining a raster segment should be removed from a raster segment cache; and
    generating a raster segment cache removal command.

13. The method of claim 1, wherein generating a command includes:
    determining a raster segment should be added to a raster segment cache; and
    generating a raster segment cache add command.

14. A method comprising:
    generating a first set of raster segments from differences between a first frame and a second frame for a user interface;
    accessing a second set of raster segments from differences between the second frame and a third frame for the user interface;
    determining whether the first raster segment of the first set is within the same raster as a second raster segment of the second set;
    determining whether the data values for the first raster segment are within a threshold of the data values of the second raster segment;
    creating a command to move the first raster segment from a first position in the second frame to a second position in the first frame based on said steps of determining;
    queuing the command at a server;
    encoding the queued command to a payload; and
    transmitting the payload to a client.

15. The method of claim 14, further comprising:
    determining whether the first raster segment matches a raster segment contained in a raster segment cache, wherein the second set of raster segments is contained in the raster segment cache stored at the server which contains the same cached raster segments as a corresponding raster segment cache stored at the client which receives the payload;
    generating a raster segment cache command to move a selected cached raster segment that corresponds to the first raster segment;
    increasing the relevance of the raster segment identified in the raster segment cache command; and
    encoding the raster segment cache command to a payload.

16. The method of claim 14, wherein the threshold is applied to each pixel difference between each pair of corresponding pixel values in a pair of compared segments.

17. The method of claim 14, wherein the threshold is applied to the average pixel difference in a pair of compared segments.

18. One or more processor readable storage devices having processor readable code embodied on said processor readable storage devices, said processor readable code for programming one or more processors to perform a method comprising:

generating a first set of raster segments from differences between a new frame to be rendered at a remote client having a user interface and a current frame rendered at the remote client;

accessing a second set of raster segments from differences between the current frame and a previous frame rendered at the remote client;

identifying a first raster segment of the first set that matches a second raster segment of the second set;

generating a raster segment cache command to move the first raster segment from a first position in the current frame to a second position in the new frame; and providing the raster segment cache command to the remote client.

19. The one or more processor readable storage devices of claim 18, wherein the generating a first set of raster segments includes:

identifying one or more adjacent pixel positions having different values between the current frame and the new frame.

* * * * *